United States Patent
Whitehead et al.

(10) Patent No.: US 6,384,979 B1
(45) Date of Patent: May 7, 2002

(54) COLOR FILTERING AND ABSORBING TOTAL INTERNAL REFLECTION IMAGE DISPLAY

(75) Inventors: Lorne A. Whitehead; Michele Ann Mossman, both of Vancouver (CA)

(73) Assignee: The University of British Columbia, Vancouver (CA)

(*) Notice: Subject to any disclaimer, the term of this patent is extended or adjusted under 35 U.S.C. 154(b) by 0 days.

(21) Appl. No.: 09/726,131

(22) Filed: Nov. 30, 2000

(51) Int. Cl.$^7$ .............................. G02B 27/10; G02F 1/07
(52) U.S. Cl. ......................................... 359/619; 359/263
(58) Field of Search ................................ 359/634, 627, 359/628, 640, 295, 263, 619

(56) References Cited

U.S. PATENT DOCUMENTS

| | | | |
|---|---|---|---|
| 3,291,554 A | 12/1966 | Price | 359/222 |
| 3,556,638 A | 1/1971 | Banks et al. | 359/222 |
| 3,571,511 A | 3/1971 | Myer | 348/759 |
| 3,612,653 A | 10/1971 | Rajchman | 359/297 |
| 3,698,793 A | 10/1972 | Tellerman | 359/290 |
| 3,730,608 A | 5/1973 | Castegnier | 359/297 |
| 3,746,785 A | 7/1973 | Goodrich | 348/771 |
| 3,796,480 A | 3/1974 | Preston, Jr. et al. | 359/295 |
| 3,987,668 A | 10/1976 | Popenoe | 116/212 |

(List continued on next page.)

FOREIGN PATENT DOCUMENTS

| | | |
|---|---|---|
| DE | 3720861 A | 3/1989 |
| DE | 4343808 A1 | 6/1995 |
| EP | 0023741 A1 | 2/1981 |
| EP | 204427 A | 12/1986 |
| EP | 728799 A1 | 8/1996 |
| EP | 797127 A | 9/1997 |
| EP | 0807832 A2 | 11/1997 |
| GB | 2265024 A | 9/1993 |
| JP | 54057576 | 5/1979 |
| JP | 59078816 | 5/1984 |
| JP | 60038130 | 2/1995 |

OTHER PUBLICATIONS

"Subdivided Electrophoretic Display", Harbour et al, Xerox Disclosure Journal, vol.4, No.6, Nov. 1979, p. 705.
"Simplified Ray Tracing in Cylindrical Systems", L.A. Whitehead, Applied Optics, vol.21, No.19, pp.3536–3538, Oct., 1, 1982.

(List continued on next page.)

Primary Examiner—Ricky Mack
(74) Attorney, Agent, or Firm—Oyen Wiggs Green & Mutala

(57) ABSTRACT

A color image display having a spatially uniform distribution of at least two different "types" of prism structure. The first type consists of a prism, a color filter associated with one of the prism's facets and two color absorbing control members, each of which can be biased away from or into optical contact with one of the prism's other two facets. The color filter has a first spectral absorption characteristic, and the control members have second and third spectral absorption characteristics respectively. The second type of prism structure consists of a second prism, a color filter associated with one of the second prism's facets and at least one color absorbing control member which can be biased away from or into optical contact with one of the second prism's other two facets. The second prism's color filter and control member have fourth and fifth spectral absorption characteristics respectively. The spectral absorption characteristics are selected such that, for any selected set comprising proximate ones of each of the two types of prism structure, controlled movement of the members between particular selected combinations of their possible respective positions causes the set as a whole to reflect light which has an average spectral reflectance characteristic corresponding to any one of three independent colors, with no one of the independent colors being obtainable by mixing any other two of the independent colors.

41 Claims, 5 Drawing Sheets

U.S. PATENT DOCUMENTS

| | | | |
|---|---|---|---|
| 4,113,360 A | 9/1978 | Baur et al. | 345/84 |
| 4,135,960 A | 1/1979 | Shuppert et al. | 156/240 |
| 4,148,563 A | 4/1979 | Herbert | 359/222 |
| 4,156,745 A | 5/1979 | Hatzakis et al. | 430/296 |
| 4,165,155 A | 8/1979 | Gordon, II et al. | 359/222 |
| 4,218,302 A | 8/1980 | Dalisa et al. | 204/299 R |
| 4,249,814 A | 2/1981 | Hull et al. | 396/457 |
| 4,324,456 A | 4/1982 | Dalisa | 359/296 |
| 4,391,490 A | 7/1983 | Hartke | 359/263 |
| 4,448,622 A | 5/1984 | Duchane et al. | 156/155 |
| 4,536,061 A | 8/1985 | Nishimura | 359/242 |
| 4,713,326 A | 12/1987 | Usui et al. | 359/222 |
| 4,867,515 A | 9/1989 | Normandin | 385/1 |
| 5,045,847 A | 9/1991 | Tarui et al. | 340/783 |
| 5,099,343 A | 3/1992 | Margerum et al. | 359/48 |
| 5,128,782 A | 7/1992 | Wood | 309/48 |
| 5,147,519 A | 9/1992 | Legge | 204/192.29 |
| 5,221,987 A | 6/1993 | Laughlin | 359/222 |
| 5,235,463 A | 8/1993 | Broussoux et al. | 359/642 |
| 5,283,148 A | 2/1994 | Rao | 430/114 |
| 5,301,009 A | 4/1994 | Shurtz, II | 359/487 |
| 5,317,667 A | 5/1994 | Weber et al. | 385/147 |
| 5,319,491 A | 6/1994 | Selbrede | 359/291 |
| 5,396,350 A | 3/1995 | Beeson et al. | 359/40 |
| 5,397,669 A | 3/1995 | Rao | 430/108 |
| 5,425,710 A | 6/1995 | Khair et al. | 604/96 |
| 5,455,709 A | 10/1995 | Dula, III et al. | 359/245 |
| 5,530,053 A | 6/1996 | Rao et al. | 524/462 |
| 5,530,067 A | 6/1996 | Rao et al. | 525/274 |
| 5,555,327 A | 9/1996 | Laughlin | 385/16 |
| 5,555,558 A | 9/1996 | Laughlin | 385/16 |
| 5,561,541 A | 10/1996 | Sharp et al. | 359/66 |
| 5,566,260 A | 10/1996 | Laughlin | 385/16 |
| 5,598,280 A | 1/1997 | Nishio et al. | 349/57 |
| 5,608,837 A | 3/1997 | Tai et al. | 385/146 |
| 5,745,632 A | 4/1998 | Dreyer | 385/133 |
| 5,841,916 A | 11/1998 | Laughlin | 385/16 |
| 5,959,777 A | 9/1999 | Whitehead | 359/618 |
| 5,999,307 A | 12/1999 | Whitehead | 359/298 |
| 6,604,784 | 5/2000 | Whitehead et al. | 359/18 |
| 6,088,013 A | 7/2000 | Montour et al. | 345/109 |
| 6,297,907 B1 * | 10/2001 | Wang | 359/585 |

OTHER PUBLICATIONS

"Surface Property Changes Induced In Poly(1–Hexene) Elastomer By High Energy Ion Irradiation", Carlson et al., Proc. 4th Intl. Conf. on Ion Beam Modification of Materials, Ithaca, NY, Jul. 16–20, pp. 507–512.

"Evanescent–Wave scattering by electrophoretic microparticles: a mechanism for optical switching", Remillard et al, Applied Optics, vol.34, No.19, Jul. 1, 1995, pp.3777–3785.

"Patented fiber switch revs speed, cuts cost", George Kotelly, in "Lightwave" Oct., 1995 web site publication of PennWell Publishing Co., Tulsa, OK.

"Colloidal Refractometry: Meaning and Measurement of Refractive Index for Dispersions; The Science That Time Forgot", M. Mohammadi, Advances in Colloid and Interface Science 62 (1995) 17–29.

"Elastomeric Light Valves", Qin et al, Advanced Materials 1997, 9, No. 5, pp. 407–410.

3M Fluorinert™ Electronic Liquid brochure, http://www.3m.com/fluids/florinrt.html, Sep., 1998.

Neufeldt, Victoria. Webster's New World Dictionary of American English, 3rd College Edition. Webster's New World, New York, New York, p. 857. Dec. 31, 1998.

"New Refractive Display Based on Total Internet Reflection In Prismatic Microstructures", Michele A. Mossman et al, Intl. Display Research Conference of the Society for Information Display, Sep., 2000.

* cited by examiner

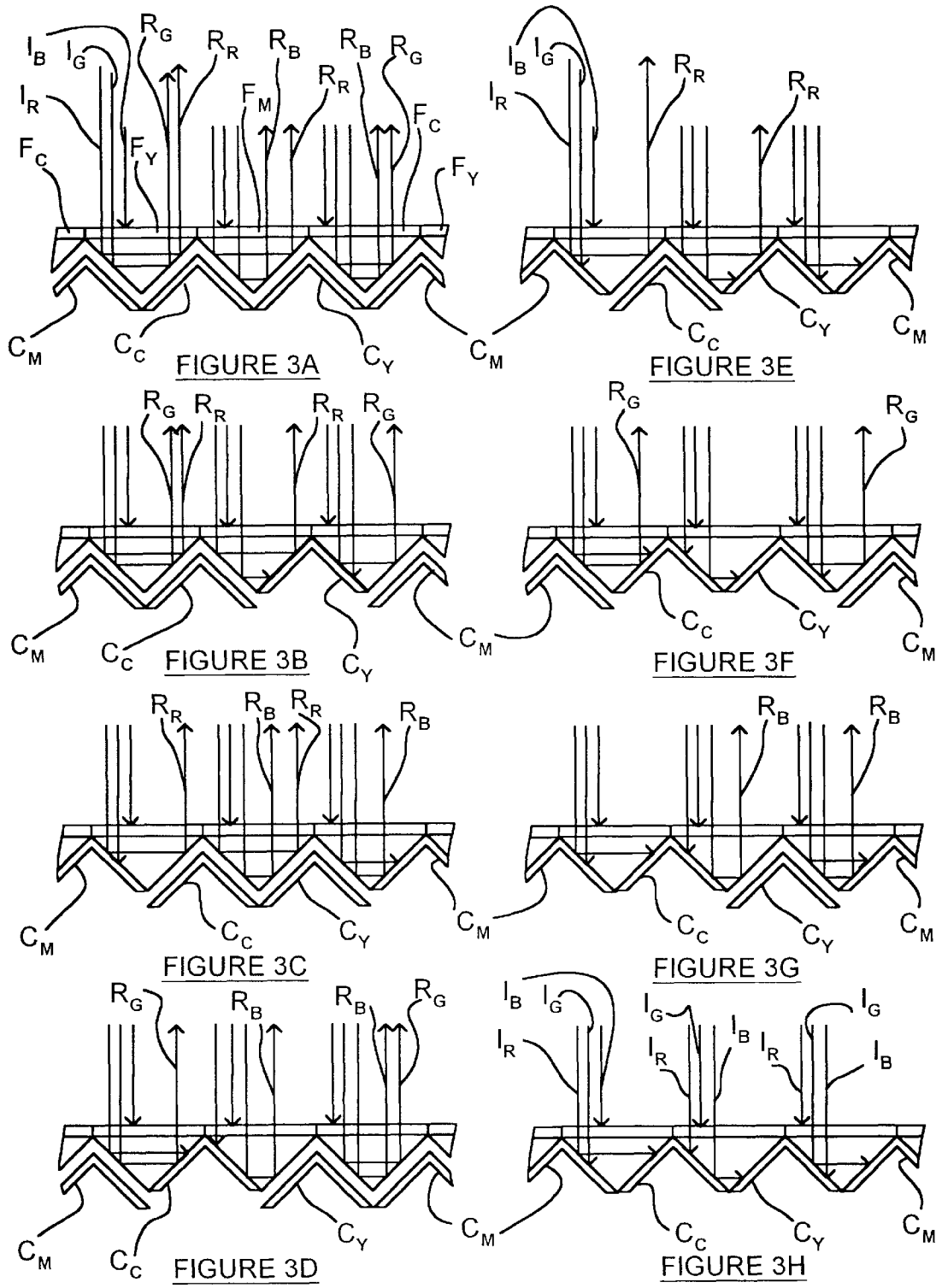

COLOR FILTERING AND ABSORBING TOTAL INTERNAL REFLECTION IMAGE DISPLAY

TECHNICAL FIELD

A reflective display device in which total internal reflection is twice controllably frustrated at an interface between materials having different refractive indices and in which subtractive color filtration is employed to yield full color images.

BACKGROUND

U.S. Pat. No. 5,959,777 (the '777 patent, which is incorporated herein by reference) titled "Passive High Efficiency Variable Reflectivity Image Display Device" and issued Sep. 28, 1999 discloses a multiple pixel image display device. Each pixel has at least one element having a reflective state in which incident light undergoes total internal reflection ("TIR"), and having a non-reflective state in which TIR is prevented (i.e. "frustrated"). Such prevention is achieved by modifying the evanescent wave associated with TIR. Specifically, a member is positioned adjacent the element and deformed between first and second positions. In the first position, a gap remains between the member and the element to allow the evanescent wave to have the usual characteristics for TIR. In the second position, the member is in optical contact with the element (that is, the gap thickness is substantially less than an optical wavelength), substantially interfering with the evanescent wave, thus preventing TIR.

U.S. Pat. No. 5,999,307 (the '307 patent, which is incorporated herein by reference) titled "Method and Apparatus for Controllable Frustration of Total Internal Reflection" and issued Dec. 7, 1999 discloses controllable switching of a TIR interface by means of an electronically actuated, microstructured, elastomer member to controllably deform the member into optical contact with the interface, within a continuously variable range of optical contact values, to produce the non-reflective state.

U.S. Pat. No. 6,064,784 (the '784 patent, which is incorporated herein by reference) titled "Electrophoretic, Dual Refraction Frustration of Total Internal Reflection in High Efficiency Variable Reflectivity Image Displays" and issued May. 16, 2000 discloses that an electrophoretic medium can be used to controllably frustrate TIR in an image display device employing prismatic reflective surfaces. "Electrophoresis" is a well known phenomenon whereby a charged species (i.e. particles, ions or molecules) moves through a medium due to the influence of an applied electric field.

U.S. patent application Ser. No. 09/324,103 (the '103 application, which is incorporated herein by reference) filed Jun. 2, 1999 and titled "Electrophoretic, High Index and Phase Transition Control of Total Internal Reflection in High Efficiency Variable Reflectivity Image Displays", discloses usage of charged particles suspended in a medium to electrophoretically control TIR at a retro-reflective surface on a high refractive index material; usage of a prismatic structure to redirect ambient light from an overhead light source toward a display image and then from the image to the viewing region in front of the image, yielding a high contrast reflective display; usage of a transparent planar waveguide to frontlight a color display; control of TIR at a retro-reflective surface by means of a vapour-liquid phase transition; and, control of TIR by changing the absorption coefficient of a material using electrical, chemical and/or electrochemical methods.

U.S. patent application Ser. No. 09/449,756 (the '756 application, which is incorporated herein by reference) filed Nov. 26, 1999 and titled "Optical Switching by Controllable Frustration of Total Internal Reflection" discloses an optical switch for controllably switching a TIR interface between reflective and non-reflective states. In one embodiment, the switch has a stiff-surfaced elastomer dielectric. A separator maintains a gap between the TIR interface and the dielectric's surface. Variation of a voltage applied between electrodes on the interface and the dielectric's surface moves the stiffened surface portion into or away from optical contact with the TIR interface. In another embodiment, the optical switch incorporates a cell containing a fluid. One side of the cell forms a light incident interface. A membrane is suspended in the fluid. One pair of electrodes is applied to opposite sides of the membrane; and, another electrode pair is applied to the side of the cell forming the interface and to the cell's opposite side. A variable voltage potential is applied between selected ones of the electrodes. Application of the voltage potential between selected ones of the membrane and cell electrodes moves the membrane into optical contact with the interface, producing the non-reflective state at the interface. Application of the voltage potential between other selected ones of the membrane and cell electrodes moves the membrane away from optical contact with the interface, producing the reflective state at the interface.

U.S. patent application Ser. No. 09/585,552 (the '552 application, which is incorporated herein by reference) filed Jun. 2, 2000 and titled "Enhanced Effective Refractive Index Total Internal Reflection Image Display", discloses an image display with parallel, macroscopically planar, structured surface, non-light absorptive light deflecting and reflecting portions which are longitudinally symmetrical in mutually perpendicular directions, both of which are perpendicular to the preferred viewing direction. A liquid containing a plurality of movable members contacts the light reflecting portion. A controller applies an electromagnetic force to selectively move the members into an evanescent wave region adjacent the light reflecting portion to frustrate TIR of light rays at selected points on the light reflecting portion. The structured surfaces on the light deflecting portion deflect light rays incident in the preferred viewing direction toward the light reflecting portion by imparting to the rays a directional component in the direction of longitudinal symmetry of the light reflecting portion. The structured surfaces on the light reflecting portion totally internally reflect the deflected light rays toward the light deflecting portion at points other than the selected points at which TIR is frustrated. Then, the structured surfaces on the light deflecting portion again deflect the totally internally reflected light rays, cancelling the directional component therefrom, such that the deflected totally internally reflected light rays emerge from the display in a direction substantially parallel to the preferred viewing direction.

The present invention improves upon the prior art by facilitating production of color displays.

SUMMARY OF INVENTION

The invention provides a color display having a spatially uniform distribution of at least first and second types of prism structure. The first type of prism structure consists of a first prism and a first color filter positioned to filter light incident upon a first facet (i.e. base) of the first prism. The first color filter has a first selected spectral absorption characteristic. A first member having a second selected spectral absorption characteristic is movable with respect to a second facet of the first prism between a first position in which the first member is in optical contact with the second facet, producing a first absorptive state in which total internal reflection of light rays at the second facet is reduced as a function of wavelength in accordance with the second selected spectral absorption characteristic, and a second position in which the first member is not in optical contact with the second facet, producing a first reflective state in which light incident upon the second facet is totally internally reflected toward a third facet of the first prism. A second member having a third selected spectral absorption characteristic is movable with respect to the third facet of the first prism between a third position in which the second member is in optical contact with the third facet, producing a second absorptive state in which total internal reflection of light rays at the third facet is reduced as a function of wavelength in accordance with the third selected spectral absorption characteristic, and a fourth position in which the second member is not in optical contact with the third facet, producing a second reflective state in which light incident upon the third facet is totally internally reflected toward and through the first color filter.

The second type of prism structure consists of a second prism and a second color filter positioned to filter light incident upon a first facet (i.e. base) of the second prism. The second color filter has a fourth selected spectral absorption characteristic. A third member having a fifth selected spectral absorption characteristic is movable with respect to a second facet of the second prism between a fifth position in which the third member is in optical contact with the second facet of the second prism, producing a third absorptive state in which total internal reflection of light rays at the second facet of the second prism is reduced as a function of wavelength in accordance with the fifth selected spectral absorption characteristic, and a sixth position in which the third member is not in optical contact with the second facet of the second prism, producing a third reflective state in which light incident upon the second facet of the second prism is totally internally reflected at the second facet of the second prism.

The spectral absorption characteristics are selected such that, for any selected set comprising proximate ones of all of the types of prism structure included in the display, controlled movement of the members between particular selected combinations of their possible respective positions causes the set to reflect light which has an average spectral reflectance characteristic corresponding to any one of three independent colors, with no one of the independent colors being obtainable by mixing any other two of the independent colors.

Advantageously, the second type of prism structure also has a fourth member having a sixth selected spectral absorption characteristic. The fourth member is movable with respect to a third facet of the second prism between a seventh position in which the fourth member is in optical contact with the third facet of the second prism, producing a fourth absorptive state in which total internal reflection of light rays at the third facet of the second prism is reduced as a function of wave-length in accordance with the sixth selected spectral absorption characteristic, and an eighth position in which the fourth member is not in optical contact with the third facet of the second prism, producing a fourth reflective state in which light incident upon the third facet of the second prism is totally internally reflected toward and through the second color filter.

The spatially uniform distribution preferably includes a third type of prism structure consisting of a third prism and a third color filter positioned to filter light incident upon a first facet (i.e. base) of the third prism. The third color filter has a seventh selected spectral absorption characteristic. A fifth member having an eighth selected spectral absorption characteristic is movable with respect to a second facet of the third prism between a ninth position in which the fifth member is in optical contact with the second facet of the third prism, producing a fifth absorptive state in which total internal reflection of light rays at the second facet of the third prism is reduced as a function of wavelength in accordance with the eighth selected spectral absorption characteristic, and a tenth position in which the fifth member is not in optical contact with the second facet of the third prism, producing a fifth reflective state in which light incident upon the second facet of the third prism is totally internally reflected toward a third facet of the third prism. A sixth member having a ninth selected spectral absorption characteristic, the sixth member movable with respect to a third facet of the third prism between an eleventh position in which the sixth member is in optical contact with the third facet of the third prism, producing a sixth absorptive state in which total internal reflection of light rays at the third facet of the third prism is reduced as a function of wavelength in accordance with the ninth selected spectral absorption characteristic, and a twelfth position in which the sixth member is not in optical contact with the third facet of the third prism, producing a sixth reflective state in which light incident upon the third facet of the third prism is totally internally reflected toward and through the third color filter.

BRIEF DESCRIPTION OF DRAWINGS

FIG. 3A schematically shows a FIG. 1A type display with FIG. 2A type control elements actuated to display the color white.

FIGS. 3B–3H show the FIG. 3A structure actuated to display the colors yellow, magenta, cyan, red, green, blue and black respectively.

DESCRIPTION

Figure 1A:
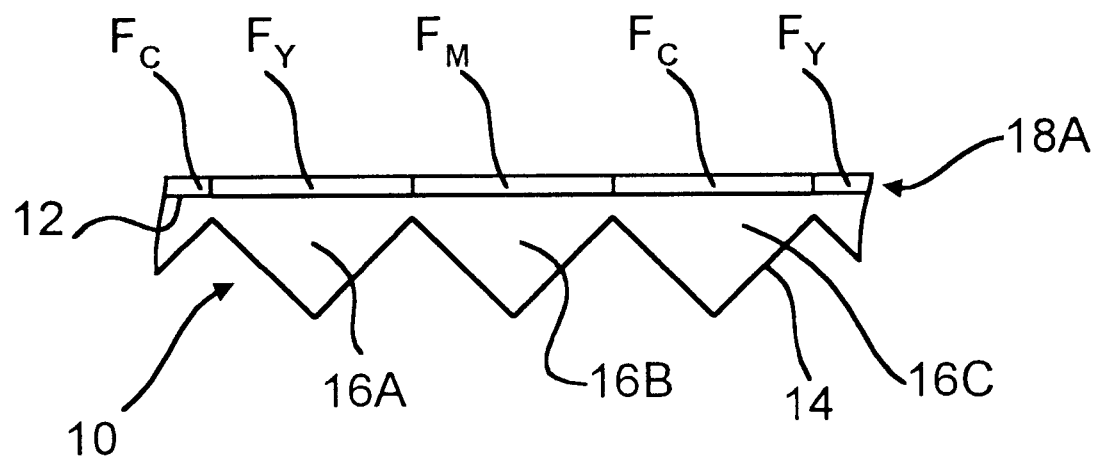
FIG. 1A is a fragmented cross-sectional view, on a greatly enlarged scale, of a portion of a color image display having a filter with different color segments atop a reflective, high refractive index prismatic material.

FIG. 1A depicts a portion of an image display in which a sheet 10 of high refractive index prismatic material is positioned with its flat viewing surface 12 outward and its prism-bearing surface 14 inward. Prisms 16A, 16B, 16C forming surface 14 may have any one of a wide range of prism or near-prism shapes, the only requirement being that the prisms be capable of totally internally reflecting incident light rays unless TIR is frustrated as hereinafter explained. Viewing surface 12 coincides with the flat base (or "first facet") portions of each of prisms 16A, 16B, 16C and of many other prisms (not shown) which extend longitudinally parallel to prisms 16A, 16B, 16C on either side thereof as viewed in FIG. 1A. Each one of prisms 16A, 16B, 16C, etc. is symmetrical about its longitudinal axis over the entire length of the prism (i.e. the cross-sectional shape of each prism does not vary as a function of length along the prism's longitudinal axis).

Sheet 10 may, for example, be a thin layer of zinc sulfide (ZnS, n≈2.4), titanium dioxide ($TiO_2$, n≈2.5), niobium pentoxide ($NbO_5$, n≈2.3) or zirconium oxide (ZrO, n≈2.1). Although higher refractive index materials are generally preferred, sheet 10 may alternatively be formed of a lower refractive index material such as polycarbonate (n≈1.6) if a multiple layered prismatic geometry is used, as described in the '784 patent, to enhance the refractive index mismatch at the TIR interface. Prisms 16A, 16B, 16C may be formed on surface 14 by machining an initially flat sheet to generate the prisms; or, by depositing high refractive index material via sputtering or evaporation techniques into a machined mould constituting a physical "negative" of the desired prismatic surface 10. Prisms 16A, 16B, 16C need only be about 2 microns deep, and sheet 10 need only be sufficiently thick (i.e. 5–10 microns) to facilitate provision of a generally but not perfectly flat frontward surface 12. If sheet 10 is insufficiently thick to be self-supporting, an additional transparent sheet (not shown) can be affixed to flat surface 12 to provide the necessary support. Any such additional sheet should be designed to minimize refraction of incident light rays and thus minimize the impact of such additional sheet on the optical characteristics of the device, as hereinafter explained. If a lower refractive index material such as polycarbonate is used, sheet 10 may be formed using wellknown polycarbonate micro-replication techniques.

A subtractive color filter 18A having a repetitively adjacent yellow segment $F_Y$, magenta segment $F_M$, cyan segment $F_C$ structure is applied atop outward viewing surface 12. This can for example be achieved by applying to outward viewing surface 12 a thin layer of a suitably colored adhesive having a refractive index substantially similar to that of sheet 10. The adhesive layer should be sufficiently thin and sufficiently transparent that it does not cause substantial deflection of either incoming or outgoing light rays, and such that it does not contribute substantially to the overall thickness of sheet 10. Care is taken to orient yellow segment $F_Y$ so that, when viewed along a notional axis (not shown) perpendicular to surface 12 and intersecting the apex of prism 16A, yellow segment $F_Y$ covers substantially the entire base portion of prism 16A without covering substantial portions of either of the prisms adjacent thereto. Similarly, magenta segment $F_M$ is oriented so that, when viewed along a notional axis (not shown) perpendicular to surface 12 and intersecting the apex of prism 16B, magenta segment $F_M$ covers substantially the entire base portion of prism 16B without covering substantial portions of either of prisms 16A or 16C; and, cyan segment $F_C$ is oriented so that, when viewed along a notional axis (not shown) perpendicular to surface 12 and intersecting the apex of prism 16C, cyan segment $F_C$ covers substantially the entire base portion of prism 16C without covering substantial portions of either of the prisms adjacent thereto.

Figure 1B:
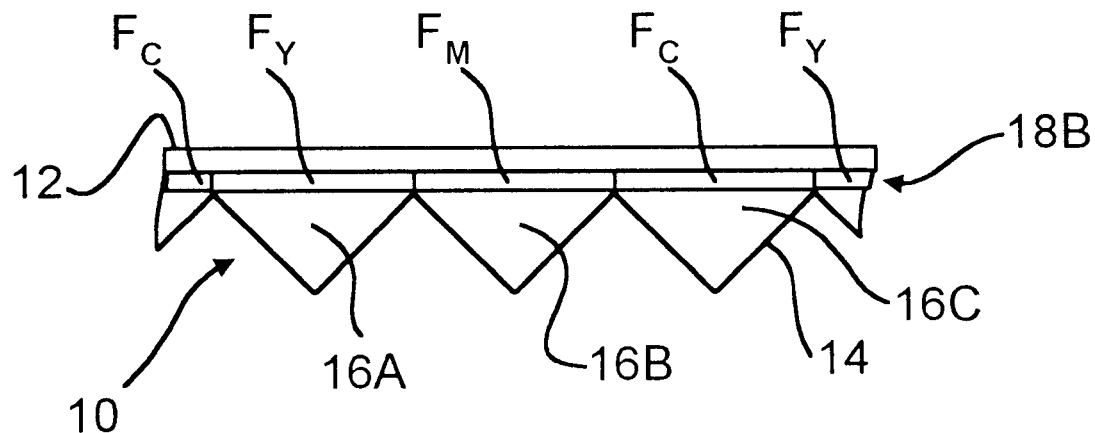
FIG. 1B depicts an alternate embodiment in which the color filter is embedded within the prismatic material.

FIG. 1B depicts a portion of an alternate image display in which subtractive color filter 18B (again having a repetitively adjacent yellow segment $F_Y$, magenta segment $F_M$, cyan segment $F_C$ structure) is embedded within sheet 10 to more precisely orient segments $F_Y$, $F_M$, $F_C$ over the bases of prisms 16A, 16B, 16C respectively, as aforesaid. This can for example be achieved by printing segments $F_Y$, $F_M$, $F_C$ as a continuously repeated pattern of suitably colored stripes on a Mylar™ sheet using conventional photographic printing techniques, then using micro-replication techniques to cast prisms 16A, 16B, 16C on the Mylar™ sheet atop the printed filter segments.

Figure 2A:
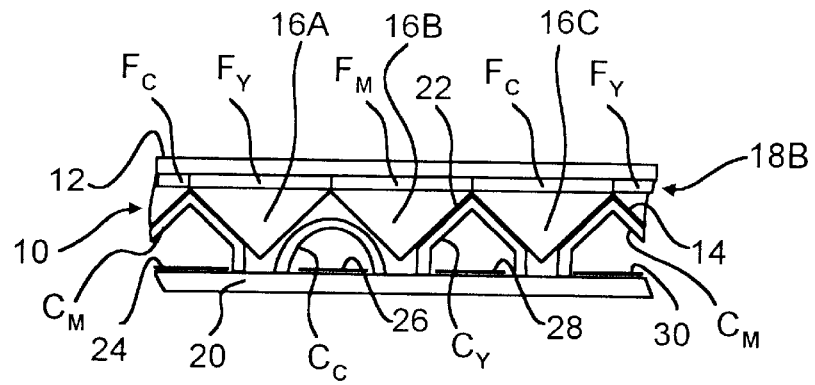
FIG. 2A is similar to FIG. 1B and shows an electrode structure for selectably and controllably moving a colored, flexible control element between a first position in which a gap remains between the element and the longitudinally opposed facets of two prisms adjacent to the element, and a second position in which the element is in optical contact with the longitudinally opposed facets of the two prisms.

FIG. 2A shows sheet 10 and its internally embedded $F_Y$, $F_M$, $F_C$ segmented subtractive color filter 18B supported adjacent a substrate 20 which extends parallel to flat viewing surface 12. Although FIG. 2A depicts a gap between substrate 20 and the apices of prisms 16A, 16B, 16C no such gap is required and it may in some cases be more convenient to manufacture the FIG. 2A apparatus with the prisms' apices contacting and/or bonded to substrate 20. A first, transparent electrode 22 is deposited on and extends continuously over substantially the entirety of inward prism-bearing surface 14. A plurality of discrete electrode segments 24, 26, 28, 30 are respectively deposited on substrate 20. Care is taken to orient electrode segment 24 so that it extends adjacent and parallel to the leftward (as viewed in FIG. 2A) facet of prism 16A. Similarly, electrode segment 26 extends adjacent and parallel to the rightward facet of prism 16A; and, adjacent and parallel to the leftward facet of prism 16B. Electrode segment 28 extends adjacent and parallel to the rightward facet of prism 16B; and, adjacent and parallel to the leftward facet of prism 16C. Electrode segment 30 extends adjacent and parallel to the rightward facet of prism 16C.

A flexible, cyan colored movable control element $C_C$ is fixed to substrate 20 above electrode segment 26. As depicted in FIG. 2A, control element $C_C$ is in a non-actuated state in which control element $C_C$ is retracted toward substrate 20, away from the rightward facet of prism 16A and away from the longitudinally adjacent leftward facet of prism 16B, leaving a gap between control element $C_C$ and the prism facets. This can be achieved by forming control element $C_C$ of an electrically conductive (or flexible conductor-bearing) elastomer material which can be controllably electronically actuated to deform the material into optical contact with the prism facets, and which regains its original shape when such electronic actuation is discontinued. Specifically, a first voltage potential is applied between electrodes 22, 26 to produce an electrostatic force which biases control element $C_C$ toward substrate 20 in the aforementioned non-actuated retracted state, leaving a gap between control element $C_C$ and the longitudinally adjacent rightward, leftward facets of prisms 16A, 16B respectively, as seen in FIG. 2A. A second voltage potential is applied between electrodes 22, 26 to produce an electrostatic force which biases control element $C_C$ toward sheet 10, placing control element $C_C$ in optical (but not electrical) contact with the adjacent rightward, leftward facets of prisms 16A, 16B respectively. In either case, control element $C_C$ can be maintained at ground potential. Avoidance of electrical contact between control element $C_C$ and electrode 22 can be achieved by applying a thin, transparent layer of electrically insulating material to the control element, or to electrode 22, or both.

A similarly shaped and sized, but yellow colored flexible, deformable control element $C_Y$ is fixed to substrate 20 above electrode segment 28, between the rightward facet of prism 16B and the longitudinally adjacent leftward facet of prism 16C. Application of the first voltage potential between electrodes 22, 28 biases (retracts) control element $C_Y$ toward substrate 20, leaving a gap between control element $C_Y$ and the adjacent rightward, leftward facets of prisms 16B, 16C respectively. Application of the second voltage potential between electrodes 22, 28 biases control element $C_Y$ toward sheet 10, placing control element $C_Y$ in optical contact with the longitudinally adjacent rightward, leftward facets of prisms 16B, 16C respectively, as seen in FIG. 2A.

Similarly shaped and sized, but magenta colored flexible, deforniable control elements $C_M$ are fixed to substrate 20 above electrode segments 24, 30 respectively. The leftward control element $C_M$ is positioned between the leftward facet of prism 16A and the longitudinally adjacent rightward facet of the (partially shown) prism to the left of prism 16A. The rightward control element $C_M$ is positioned between the rightward facet of prism 16C and the longitudinally adjacent leftward facet of the (partially shown) prism to the right of prism 16C. Application of the first voltage potential between electrodes 22, 24 biases leftward control element $C_M$ toward substrate 20, leaving a gap between leftward control element $C_M$ and the adjacent leftward facet of prism 16A. Application of the second voltage potential between electrodes 22, 24 biases leftward control element $C_M$ toward sheet 10, placing leftward control element $C_M$ in optical contact with the adjacent leftward facet of prism 16A, as seen in FIG. 2A. Application of the first voltage potential between electrodes 22, 30 biases rightward control element $C_M$ toward substrate 20, leaving a gap between rightward control element $C_M$ and the adjacent rightward facet of prism 16C. Application of the second voltage potential between electrodes 22, 30 biases rightward control element $C_M$ toward sheet 10, placing rightward control element $C_M$ in optical contact with the adjacent rightward facet of prism 16C, as seen in FIG. 2A. The optical characteristics of substrate 20 are relatively unimportant; substrate 20 need only serve as a suitable mounting support for electrode segments 24, 26, 28, 30 and for control elements $C_C$, $C_Y$, $C_M$.

Figure 2B:
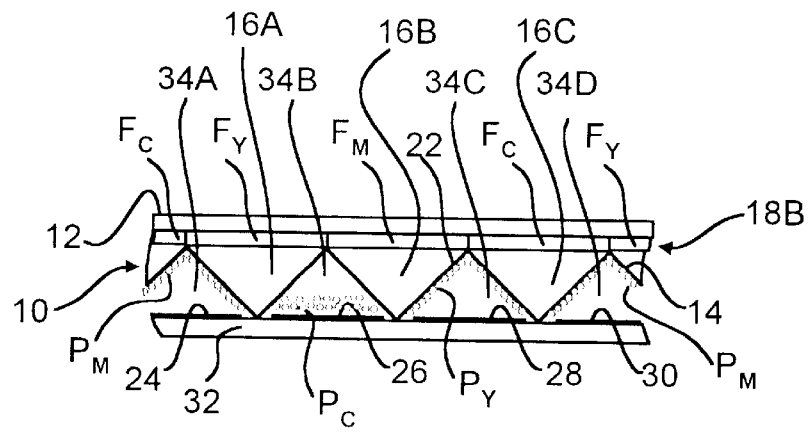
FIG. 2B is similar to FIG. 1B and shows an electrode structure for selectably and controllably electrophoretically moving a group of colored absorptive particles between a first position in which a gap remains between the particle group and the longitudinally opposed facets of two prisms adjacent to the particle group, and a second position in which the particle group is in optical contact with the longitudinally opposed facets of the two prisms.

FIG. 2B shows sheet 10 and its internally embedded $F_Y$, $F_M$, $F_C$ segmented subtractive color filter 18B supported adjacent a substrate 32 which extends parallel to flat viewing surface 12 and is bonded to the apices of prisms 16A, 16B, 16C creating a plurality of prism-shaped channels 34A, 34B, 34C, 34D between the adjacent facets of prisms 16A, 16B, 16C, the rightward facet of the (partially shown) prism to the left of prism 16A and the leftward facet of the (partially shown) prism to the right of prism 16C. As in the FIG. 2A embodiment, a first, transparent electrode 22 is deposited on and extends continuously over substantially the entirety of inward prism-bearing surface 14. A plurality of discrete electrode segments 24, 26, 28, 30 are respectively deposited on substrate 20. Care is taken to orient electrode segment 24 so that it extends within channel 34A adjacent and parallel to the leftward (as viewed in FIG. 2B) facet of prism 16A. Similarly, electrode segment 26 extends within channel 34B adjacent and parallel to the rightward facet of prism 16A; and, adjacent and parallel to the leftward facet of prism 16B. Electrode segment 28 extends within channel 34C adjacent and parallel to the rightward facet of prism 16B; and, adjacent and parallel to the leftward facet of prism 16C. Electrode segment 30 extends within channel 34D adjacent and parallel to the rightward facet of prism 16C.

An electrophoresis medium is confined within each one of channels 34A, 34B, 34C, 34D such that the electrophoresis medium in channel 34A contacts the leftward facet of prism 16A, the electrophoresis medium in channel 34B contacts the rightward facet of prism 16A and the leftward facet of prism 16B, the electrophoresis medium in channel 34C contacts the rightward facet of prism 16B and the leftward facet of prism 16C, and the electroplioresis medium in channel 34D contacts the rightward facet of prism 16C. The electrophoresis medium is preferably a low refractive index, low viscosity, electrically insulating liquid such as Fluorinert™ Electronic Liquid FC-72 (n≈1.25) or FC-75 (n≈1.27) heat transfer media available from 3M, St. Paul, Mich. A Fluorinert:ZnS TIR interface is thus formed (assuming ZnS is used to form sheet 10).

The electrophoresis medium within channel 34A contains a finely dispersed suspension of light absorptive magenta colored particles $P_M$ such as dyed silica (n≈1.44) particles, latex (n≈1.5) particles, pigment (n variable) particles, etc. As used herein in reference to particles or control elements, the term "light absorptive" includes particles (or control elements) which are either light absorptive, or which are both light absorptive and light scattering, but does not include particles (or control elements) having only a light scattering characteristic with no light absorption characteristic. The optical characteristics of substrate 32 are relatively unimportant; sheet 32 need only form channels 34A, 34B, 34C, 34D for containment of the electrophoresis medium and particles. The electrophoresis medium within channel 34B contains a finely dispersed suspension of light absorptive cyan colored particles $P_C$; the electrophoresis medium within channel 34C contains a finely dispersed suspension of light absorptive yellow colored particles $P_Y$, and the electrophoresis medium within channel 34D contains a finely dispersed suspension of light absorptive magenta colored particles $P_M$.

The FIG. 2B embodiment facilitates frustration of TIR without the need for mechanical movement of control elements as in the FIG. 2A embodiment, without the need for maintenance of a gap (i.e. a region of non-optical contact between the control elements and inward prism-bearing surface 14) whenever TIR is not to be frustrated, and without the need for precisely matching flat surfaces at the TIR interface (i.e. on the facets of prisms 16A, 16B, 16C). Mechanical frustration of TIR is best accomplished at a flat surface, since it is easier to achieve optical contact at a flat surface. It is comparatively difficult to mechanically frustrate TIR at a prismatic surface, due to the difficulty in attaining the required matching alignment accuracy between the prismatic surface and the part which is to be mechanically moved into and out of optical contact with the prismatic surface. However, a liquid electrophoretic medium easily flows to surround reflective prism-bearing surface 14, thus eliminating the alignment difficulty and rendering practical the usage of a prismatic micro-structured surface as the TIR interface.

Before further explaining the operation of the FIG. 2B embodiment, it is useful to review some well known color theory principles. The CIE chromaticity coordinate system is used to define any desired color hue as a mixture of appropriate intensities of three primary colors X, Y, Z in an appropriate ratio. For example, a desired color Q can be obtained by mixing an intensity a of color X, an intensity b of color Y, and an intensity c of color Z. This is represented mathematically as Q=aX+bY+cZ. X, Y, Z can be thought of as respectively representing the three mutually perpendicular color intensity (chromaticity) axes of a chromaticity coordinate system, defining a color "volume" within which all possible colors can be located. The aforementioned color Q is defined by the coordinates (a,b,c) within this volume. Although it is often convenient to use either the primary additive colors red (R), green (G) and blue (B); or, the primary subtractive colors cyan (C), magenta (M), yellow (Y) as the color intensity (chromaticity) axes of a chromaticity coordinate system, many other axial colors can be used to define different chromaticity coordinate systems capable of representing all possible colors. It is only necessary to ensure that no one of the three selected axial colors can be obtained by mixing the other two selected axial colors. By moving a color absorptive member through a range of optical contact or near optical contact positions relative to a prism facet, one may vary the relative color intensity of light rays reflected (as hereinafter explained) at that facet, thereby generating any desired average reflectance spectrum (corresponding to any desired CIE chromaticity coordinates) over the surface of a selected subset of prismatic elements. Accordingly, although the present invention is hereinafter primarily described in terms of the primary subtractive colors cyan, magenta, and yellow; and, in terms of the primary additive colors red, green and blue; persons skilled in the art will understand that any CIE chromaticity coordinate system can be used to implement the invention.

It is also convenient to recollect that, when mixed together in equal amounts of equal intensity proportions, the primary subtractive colors cyan, magenta, and yellow yield the color black. The term "subtractive" implies that a material of a given color absorbs light of a given wavelength (i.e. color), and reflects all others. For example, a magenta colored material absorbs green light while reflecting red and blue light; a cyan colored material absorbs red light while reflecting green and blue light; and, a yellow colored material absorbs blue light while reflecting red and green light. When mixed together in equal amounts of equal intensity proportions, the primary additive colors red, green and blue yield the color white. The term "additive" implies that different combinations of red, green and blue wavelengths (i.e. colors) yield other colors. If equal amounts of equal intensity proportions of only the two primary colors red and green are mixed together the resultant color appears yellow. Similarly, a mixture of equal amounts of equal intensity proportions of red and blue yields the color magenta; and, a mixture of equal amounts of equal intensity proportions of green and blue yields the color cyan. The color black corresponds to a complete absence of any colors.

The embodiments of FIGS. 2A and 2B have three different "types" of prism structures. Each of the three types consists of a prism, a color filter with a first selected spectral absorption characteristic (i.e. absorption as a function of wavelength) associated with a first facet (i.e. base) of the prism, a first control member with a second selected spectral absorption characteristic associated with a second facet of the prism, and a second control member with a third selected spectral absorption characteristic associated with a third facet of the prism. There is no essential relationship between the spectral absorption characteristics selected for any one of the three types of prism structure and those selected for either of the other two types of prism structures. One need only ensure that the spectral absorption characteristics are selected such that, for any selected set comprising proximate ones of all three types of prism structure, controlled movement of the members between particular selected combinations of their possible respective positions causes the set as a whole to reflect light which has an average spectral reflectance characteristic corresponding to any one of three independent colors. "Independent" means that no one of the three colors is obtainable by mixing any other two of the three colors. "Proximate" means that all of the prism structures in the set are sufficiently close to one another that the human eye does not distinguish light rays exiting from any one prism structure in the set apart from light rays exiting from any other prism structure in the set. A large number of each of the three types of prism structures are interleaved to provide a spatially uniform distribution of all three types in any selected macroscopic portion of the display.

Prism 16A shown in FIGS. 2A and 2B is accordingly exemplary of a "first" type of prism structure having a color filter $F_Y$ with a yellow spectral absorption characteristic, a control member (element) $C_M$ (or particles $P_M$) with a magenta spectral absorption characteristic, and a control member (element) $C_C$ (or particles $P_C$) with a cyan spectral absorption characteristic. Similarly, prism 16B shown in FIGS. 2A and 2B is a "second" type of prism structure having a at color filter $F_M$ with a magenta spectral absorption characteristic, a control member (element) $C_C$ (or particles $P_C$) with a cyan spectral absorption characteristic, and a control member (element) $C_Y$ (or particles $P_Y$) with a yellow spectral absorption characteristic; and, prism 16C shown in FIGS. 2A and 2B is a "third" type of prism structure having a color filter $F_C$ with a cyan spectral absorption characteristic, a control member (element) $C_Y$ (or particles $P_Y$) with a yellow spectral absorption characteristic, and a control member (element) $C_M$ (or particles $P_M$) with a magenta spectral absorption characteristic.

It will accordingly be understood, with reference to FIGS. 1A and 1B, that yellow filter segment $F_Y$ absorbs incident blue light while allowing only incident red or green light to pass through yellow filter segment $F_Y$ into prism 16A; magenta filter segment $F_M$ absorbs incident green light while allowing only incident red or blue light to pass through magenta filter segment $F_M$ into prism 16B; and, cyan filter segment $F_C$ absorbs incident red light while allowing only incident green or blue light to pass through cyan filter segment $F_C$ into prism 16C.

Turning now to FIG. 2B, if a first voltage potential is applied across the electrophoretic medium in channel 34A (i.e. between electrodes 22, 24) the magenta colored particles $P_M$ suspended in the electrophoretic medium in channel 34A are electrophoretically moved to within about 0.25 micron of the TIR interface at the leftward facet of prism 16A (i.e. inside the evanescent wave region, as is illustrated for particles $P_M$ in channel 34A in FIG. 2l). As previously explained, yellow filter segment $F_Y$ allows only red or green light to pass into prism 16A; and, a magenta colored material absorbs green light while reflecting red and blue light. Accordingly, when electrophoretically moved as aforesaid, magenta colored particles $P_M$ in channel 34A absorb green light at the leftward facet of prism 16A by causing a refractive index mismatch for green light at the TIR interface, but without causing a mismatch for red light. Green light rays are therefore absorbed as they strike particles $P_M$ inside the evanescent wave region of the TIR interface at the leftward facet of prism 16A, whereas red light rays are unaffected and are totally internally reflected toward the rightward facet of prism 16A. If a second voltage potential is applied across the electroplioretic medium in channel 34A the magenta colored particles $P_M$ in channel 34A are electrophoretically moved away from the TIR interface at the leftward facet of prism 16A, thus allowing both red and green light rays which pass through yellow filter segment $F_Y$ to be totally internally reflected at the TIR interface toward the rightward facet of prism 16A.

If a third voltage potential is applied across the electrophoretic medium in channel 34B (i.e. between electrodes 22, 26) the cyan colored particles $P_C$ suspended in the electrophoretic medium in channel 34B are electrophoretically moved to within about 0.25 micron of the TIR interfaces at the rightward facet of prism 16A and at the leftward facet of prism 16B. As explained in the preceding paragraph, yellow filter segment $F_Y$ atop prism 16A and selective electrophoretic movement of magenta colored particles $P_M$ in channel 34A ensures that only red light rays or a combination of both red and green light rays are totally internally reflected toward the rightward facet of prism 16A. As was also previously explained, a cyan colored material absorbs red light while reflecting green and blue light. Accordingly, when cyan colored particles $P_C$ are electrophoretically moved inside the evanescent wave region of the TIR interface at the rightward facet of prism 16A, any red light rays reaching that interface are absorbed, whereas any green light rays reaching that interface are totally internally reflected toward and through yellow filter segment $F_Y$, which passes green light rays as previously explained.

It is well known to persons familiar with optical ray tracing techniques that the above described ray paths are reversible. For example, instead of first encountering the leftward facet of prism 16A, red or green light rays passing through yellow filter segment $F_Y$ may instead first encounter the rightward facet of prism 16A. In such case, and if the cyan colored particles $P_C$ in channel 34B are electrophoretically moved inside the evanescent wave region of the TIR interface at the rightward facet of prism 16A, then any red light rays reaching that interface are absorbed, whereas any green light rays reaching that interface are totally internally reflected toward the leftward facet of prism 16A. If the cyan colored particles $P_C$ in channel 34B are not electrophoretically moved to within about 0.25 micron of the TIR interface at the rightward facet of prism 16A then the red light rays are also totally internally reflected toward leftward facet of prism 16A. If the magenta colored particles $P_M$ in channel 34A are electrophoretically moved inside the evanescent wave region of the TIR interface at the leftward facet of prism 16A, then any green light rays reaching that interface are absorbed, whereas any red light rays reaching that interface are totally internally reflected toward and exit through yellow filter segment $F_Y$. If the magenta colored particles $P_M$ in channel 34A are not electroplioretically moved to within about 0.25 micron of the TIR interface at the leftward facet of prism 16A, then the green light rays are also totally internally reflected toward and exit through yellow filter segment $F_Y$. Persons skilled in the art will understand that similar principles of reversibility apply to all of the ray paths described herein (including the claims); and, that the invention defined by the accompanying claims in not restricted to any particular light ray direction.

If a fourth voltage potential is applied across the electrophoretic medium in channel 34B the cyan colored particles $P_C$ suspended in the electrophoretic medium in channel 34B are electrophoretically moved away from the TIR interface at the rightward facet of prism 16A (as is illustrated for particles $P_C$ in channel 34B in FIG. 2B), thus allowing both red and green light rays which pass yellow filter segment $F_Y$ and which are totally internally reflected by the TIR interface at the leftward facet of prism 16A to be further totally internally reflected by the TIR interface at the rightward facet of prism 16A toward and through yellow filter segment $F_Y$, which passes both red and green light rays as previously explained.

Now consider the situation in which cyan colored particles $P_C$ in channel 34B are electrophoretically moved as aforesaid inside the evanescent wave region of the TIR interface at the leftward facet of prism 16B. As previously explained, magenta filter segment $F_M$ allows only red or blue light to pass into prism 16B; and, a cyan colored material absorbs red light while reflecting green and blue light. Accordingly, when electrophoretically moved as aforesaid, cyan colored particles $P_C$ in channel 34B absorb red light at the leftward facet of prism 16B by causing a refractive index mismatch for red light at the TIR interface, but without causing a mismatch for blue light. Red light rays are therefore absorbed as they strike particles $P_C$ inside the evanescent wave region of the TIR interface at the leftward facet of prism 16B, whereas blue light rays are unaffected and are totally internally reflected toward the rightward facet of prism 16B. When the fourth voltage potential is applied across the electrophoretic medium in channel 34B the cyan colored particles $P_C$ in channel 34B are clectrophoretically moved away from the TIR interface at the leftward facet of prism 16B, thus allowing both red and blue light rays which pass magenta filter segment $F_M$ to be totally internally reflected at the TIR interface toward the rightward facet of prism 16B.

If a fifth voltage potential is applied across the electrophoretic medium in channel 34C (i.e. between electrodes 22, 28) the yellow colored particles $P_Y$ suspended in the electrophoretic medium in channel 34C are electrophoretically moved to within about 0.25 micron of the TIR interfaces at the rightward facet of prism 16B and at the leftward facet of prism 16C (as is illustrated for particles $P_Y$ in channel 34C in FIG. 2B). As previously explained, magenta filter segment $F_M$ atop prism 16B and selective electroplioretic movement of cyan colored particles $P_C$ in channel 34B ensures that only red light rays or a combination of both red and blue light rays are totally internally reflected toward the rightward facet of prism 16B. As was also previously explained, a yellow colored material absorbs blue light while reflecting red and green light. Accordingly, when yellow colored particles $P_Y$ are electroplioretically moved inside the evanescent wave region of the TIR interface at the rightward facet of prism 16B, any blue light rays reaching that interface are absorbed, whereas any red light rays reaching that interface are totally internally reflected toward and through magenta filter segment $F_M$, which passes red light rays as previously explained.

If a sixth voltage potential is applied across the electrophoretic medium in channel 34C the yellow colored particles $P_Y$ suspended in the electrophoretic medium in channel 34C are electrophoretically moved away from the TIR interface at the rightward facet of prism 16B, thus allowing both red and blue light rays which pass magenta filter segment $F_M$ and which are totally internally reflected by the TIR interface at the leftward facet of prism 16B to be further totally internally reflected by the TIR interface at the rightward facet of prism 16B toward and through magenta filter segment $F_M$, which passes both red and blue light rays as previously explained.

Now consider the situation in which yellow colored particles $P_Y$ in channel 34C are electrophioretically moved as aforesaid inside the evanescent wave region of the TIR interface at the leftward facet of prism 16C. As previously explained, cyan filter segment $F_C$ allows only green or blue light to pass into prism 16C; and, a yellow colored material absorbs blue light while reflecting red and green light. Accordingly, when electrophoretically moved as aforesaid, yellow colored particles $P_Y$ in channel 34C absorb blue light at the leftward facet of prism 16C by causing a refractive index mismatch for blue light at the TIR interface, but without causing a mismatch for green light. Blue light rays are therefore absorbed as they strike particles $P_Y$ inside the evanescent wave region of the TIR interface at the leftward facet of prism 16C, whereas green light rays are unaffected and are totally internally reflected toward the rightward facet of prism 16C. When the sixth voltage potential is applied across the electrophoretic medium in channel 34C the yellow colored particles $P_Y$ in channel 34C are electrophoretically moved away from the TIR interface at the leftward facet of prism 16C, thus allowing both green and blue light rays which pass cyan filter segment $F_C$ to be totally internally reflected at the TIR interface toward the rightward facet of prism 16C.

If a seventh voltage potential is applied across the electrophoretic medium in channel 34D (i.e. between electrodes 22, 30) the magenta colored particles $P_M$ suspended in the electrophoretic medium in channel 34D are electrophoretically moved to within about 0.25 micron of the TIR interface at the rightward facet of prism 16C (as is illustrated for particles $P_M$ in channel 34D in FIG. 2B). As previously explained, cyan filter segment $F_C$ atop prism 16C and selective electrophoretic movement of yellow colored particles $P_Y$ in channel 34C ensures that only green light rays or a combination of both green and blue light rays are totally internally reflected toward the rightward facet of prism 16C. As was also previously explained, a magenta colored material absorbs green light while reflecting red and blue light. Accordingly, when magenta colored particles $P_M$ are electrophoretically moved inside the evanescent wave region of the TIR interface at the rightward facet of prism 16C, any green light rays reaching that interface are absorbed, whereas any blue light rays reaching that interface are totally internally reflected toward and through the cyan filter segment $F_C$ atop prism 16C, which passes blue light rays as previously explained.

If an eighth voltage potential is applied across the electrophoretic medium in channel 34D the magenta colored particles $P_M$ suspended in the electroplioretic medium in channel 34D are electrophoretically moved away from the TIR interface at the rightward facet of prism 16C, thus allowing both green and blue light rays which pass the cyan filter segment $F_C$ atop prism 16C and which are totally internally reflected by the TIR interface at the leftward facet of prism 16C to be further totally internally reflected by the TIR interface at the rightward facet of prism 16C toward and through the cyan filter segment $F_C$ atop prism 16C, which passes both green and blue light rays as previously explained.

FIGS. 3A–3H illustrate the foregoing, with $I_R$, $I_G$, $I_B$ representing incident red, green and blue light rays respectively; and, $R_R$, $R_G$, $R_B$ respectively representing red, green and blue light rays which undergo total internal reflection twice and exit in a direction substantially opposite to the direction of the incident light rays. For clarity, FIGS. 3A–3H do not show any electrodes; cyan, yellow and magenta colored control elements $C_C$, $C_Y$, $C_M$ are shown instead of electrophoretically movable subtractive colored particles; and, the subtractive filter incorporating yellow, magenta and cyan filter segments $F_Y$, $F_M$, $F_C$ is shown atop prisms 16A, 16B, 16C respectively rather than being embedded therein. Persons skilled in the art will however understand that one could substitute an electrophoresis medium containing cyan, yellow and magenta colored particles $P_c$, $P_Y$, $P_M$ for control elements $C_C$, $C_Y$, $C_M$ respectively; and/or embed yellow, magenta and cyan filter segments $F_Y$, $F_M$, $F_C$ within prisms 16A, 16B, 16C respectively as previously explained.

More particularly, FIG. 3A depicts the situation in which the color white is displayed by biasing all of the control elements $C_C$, $C_Y$, $C_M$ away from the TIR interface. The color white is displayed because equal proportions of the colors red, green and blue exit. Specifically, the yellow filter segment $F_Y$ atop prism 16A absorbs blue incident light rays $I_B$ and passes both red and green incident light rays $I_R$, $I_G$ which undergo total internal reflection twice within prism 16A and exit through yellow filter segment $F_Y$ as rays $R_R$, $R_G$ respectively. The magenta filter segment $F_M$ atop prism 16B absorbs green incident light rays $I_G$ and passes both red and blue incident light rays $I_R$, $I_B$ which undergo total internal reflection twice within prism 16B and exit through magenta filter segment $F_M$ as rays $R_R$, $R_B$ respectively. The cyan filter segment $F_C$ atop prism 16C absorbs red incident light rays $I_R$ and passes both green and blue incident light rays $I_G$, $I_B$ which undergo total internal reflection twice within prism 16C and exit through cyan filter segment $F_C$ as rays $R_G$, $R_B$ respectively.

FIG. 3B depicts the situation in which the color yellow is displayed by biasing the yellow control element $C_Y$ into optical contact with the TIR interfaces at the rightward facet of prism 16B and leftward facet of prism 16C, with the cyan and magenta control elements $C_C$, $C_M$ being biased away from the TIR interface. The color yellow is displayed because equal proportions of the colors red and green exit. Specifically, the yellow filter segment $F_Y$ atop prism 16A absorbs blue incident light rays $I_B$ and passes both red and green incident light rays $I_R$, $I_G$ which undergo total internal reflection twice within prism 16A and exit through yellow filter segment $F_Y$ as rays $R_R$, $R_G$ respectively. The magenta filter segment $F_M$ atop prism 16B absorbs green incident light rays $I_G$ and passes both red and blue incident light rays $I_R$, $I_B$; both of which are totally internally reflected at the leftward facet of prism 16B toward the rightward facet of prism 16B. The yellow control element $C_Y$ biased against the rightward facet of prism 16B absorbs the reflected blue light rays but totally internally reflects the reflected red light rays toward and through magenta filter segment $F_M$ as rays $R_R$. The cyan filter segment $F_C$ atop prism 16C absorbs red incident light rays $I_R$ and passes both green and blue incident light rays $I_G$, $I_B$ toward the leftward facet of prism 16C. The yellow control element $C_Y$ biased against the leftward facet of prism 16C absorbs the blue light rays but totally internally reflects the green light rays toward the rightward facet of prism 16C where the reflected green light rays again undergo total internal reflection toward and exit through cyan filter segment $F_C$ as rays $R_G$.

FIG. 3C depicts the situation in which the color magenta is displayed by biasing the leftward magenta control element $C_M$ into optical contact with the TIR interface at the leftward facet of prism 16A, and biasing the rightward magenta control element $C_M$ into optical contact with the TIR interface at the rightward facet of prism 16C, with the yellow and cyan control elements $C_Y$, $C_C$ being biased away from the TIR interface. The color magenta is displayed because equal proportions of the colors red and blue exit. Specifically, the yellow filter segment $F_Y$ atop prism 16A absorbs blue incident light rays $I_B$ and passes both red and green incident light rays $I_R$, $I_G$ toward the leftward facet of prism 16A. The leftward magenta control element $C_M$ biased against the leftward facet of prism 16A absorbs the green light rays but totally internally reflects the red light rays toward the rightward facet of prism 16A where the reflected red light rays again undergo total internal reflection toward and exit through yellow filter segment $F_Y$ as rays $R_R$. The magenta filter segment $F_M$ atop prism 16B absorbs green incident light rays $I_G$ and passes both red and blue incident light rays $I_R$, $I_B$; both of which undergo total internal reflection twice within prism 16B and exit through magenta filter segment $F_M$ as rays $R_R$, $R_B$ respectively. The cyan filter segment $F_C$ atop prism 16C absorbs red incident light rays $I_R$ and passes both green and blue incident light rays $I_G$, $I_B$; both of which are totally internally reflected at the leftward facet of prism 16C toward the rightward facet of prism 16C. The rightward magenta control element $C_M$ biased against the rightward facet of prism 16C absorbs the green light rays but totally internally reflects the blue light rays toward and through cyan filter segment $F_C$ as rays $R_B$.

FIG. 3D depicts the situation in which the color cyan is displayed by biasing the cyan control element $C_C$ into optical contact with the TIR interfaces at the rightward facet of prism 16A and leftward facet of prism 16B, with the yellow and magenta control elements $C_Y$, $C_M$ being biased away from the TIR interface. The color cyan is displayed because equal proportions of the colors green and blue exit. Specifically, the yellow filter segment $F_Y$ atop prism 16A absorbs blue incident light rays $I_B$ and passes both red and green incident light rays $I_R$, $I_G$; both of which are totally internally reflected at the leftward facet of prism 16A toward the rightward facet of prism 16A. The cyan control element $C_C$ biased against the rightward facet of prism 16A absorbs the reflected red light rays but totally internally reflects the reflected green light rays toward and through yellow filter segment $F_Y$ as rays $R_G$. The magenta filter segment $F_M$ atop prism 16B absorbs green incident light rays $I_G$ and passes both red and blue incident light rays $I_R$, $I_B$, toward the leftward facet of prism 16B. The cyan control element $C_C$ biased against the leftward facet of prism 16B absorbs the red light rays but totally internally reflects the blue light rays the rightward facet of prism 16B where the reflected blue light rays again undergo total internal reflection toward and exit through magenta filter segment $F_M$ as rays $R_B$. The cyan filter segment $F_C$ atop prism 16C absorbs red incident light rays $I_R$ and passes both green and blue incident light rays $I_G$, $I_B$ which undergo total internal reflection twice within prism 16C and exit through cyan filter segment $F_C$ as rays $R_G$, $R_B$ respectively.

FIG. 3E depicts the situation in which the color red is displayed by biasing the leftward magenta control element $C_M$ into optical contact with the TIR interface at the leftward facet of prism 16A, and biasing the rightward magenta control element $C_M$ into optical contact with the TIR interface at the rightward facet of prism 16C, and biasing the yellow control element $C_Y$ into optical contact with the TIR interfaces at the rightward facet of prism 16B and leftward facet of prism 16C, with the cyan control element $C_C$ being biased away from the TIR interface. The color red is displayed because only red light rays exit. Specifically, the yellow filter segment $F_Y$ atop prism 16A absorbs blue incident light rays $I_B$ and passes both red and green incident light rays $I_R$, $I_G$ toward the leftward facet of prism 16A. The leftward magenta control element $C_M$ biased against the leftward facet of prism 16A absorbs the green light rays but totally internally reflects the red light rays toward the rightward facet of prism 16A where the reflected red light rays again undergo total internal reflection toward and exit through yellow filter segment $F_Y$ as rays $R_R$. The magenta filter segment $F_M$ atop prism 16B absorbs green incident light rays $I_G$ and passes both red and blue incident light rays $I_R$, $I_B$; both of which are totally internally reflected at the leftward facet of prism 16B toward the rightward facet of prism 16B. The yellow control element $C_Y$ biased against the rightward facet of prism 16B absorbs the reflected blue light rays but totally internally reflects the reflected red light rays toward and through magenta filter segment $F_M$ as rays $R_R$. The cyan filter segment $F_C$ atop prism 16C absorbs red incident light rays $I_R$ and passes both green and blue incident light rays $I_G$, $I_B$ toward the rightward facet of prism 16C. The yellow control element $C_Y$ biased against the leftward facet of prism 16C absorbs the blue light rays but totally internally reflects the green light rays toward the rightward facet of prism 16C. The rightward magenta control element $C_M$ biased against the rightward facet of prism 16C absorbs the green light rays, so no light rays exit through cyan filter segment $F_C$.

FIG. 3F depicts the situation in which the color green is displayed by biasing the cyan control element $C_C$ into optical contact with the TIR interfaces at the rightward facet of prism 16A and leftward facet of prism 16B, and biasing the yellow control element $C_Y$ into optical contact with the TIR interfaces at the rightward facet of prism 16B and leftward facet of prism 16C, with the leftward and rightward magenta control elements $C_M$ being biased away from the TIR interface. The color green is displayed because only green light rays exit. Specifically, the yellow filter segment $F_Y$ atop prism 16A absorbs blue incident light rays $I_B$ and passes both red and green incident light rays $I_R$, $I_G$; both of which are totally internally reflected at the leftward facet of prism 16A toward the rightward facet of prism 16A. The cyan control element $C_C$ biased against the rightward facet of prism 16A absorbs the reflected red light rays but totally internally reflects the reflected green light rays toward and through yellow filter segment $F_Y$ as rays $R_G$, The magenta filter segment $F_M$ atop prism 16B absorbs green incident light rays $I_G$ and passes both red and blue incident light rays $I_R$, $I_B$ toward the leftward facet of prism 16B. The cyan control element $C_C$ biased against the leftward facet of prism 16B absorbs the red light rays but totally internally reflects the blue light rays the rightward facet of prism 16B. The yellow control element $C_Y$ biased against the rightward facet of prism 16B absorbs the blue light rays, so no light rays exit through magenta filter segment $F_M$. The cyan filter segment $F_C$ atop prism 16C absorbs red incident light rays $I_R$ and passes both green and blue incident light rays $I_G$, $I_B$ toward the leftward facet of prism 16C. The yellow control element $C_Y$ biased against the leftward facet of prism 16C absorbs the blue light rays but totally internally reflects the green light rays toward the rightward facet of prism 16C where the reflected green light rays again undergo total internal reflection toward and exit through cyan filter segment $F_C$ as rays $R_G$.

FIG. 3G depicts the situation in which the color blue is displayed by biasing the leftward magenta control element $C_M$ into optical contact with the TIR interface at the leftward facet of prism 16A, and biasing the rightward magenta control element $C_M$ into optical contact with the TIR interface at the rightward facet of prism 16C, and biasing the cyan control element $C_C$ into optical contact with the TIR interfaces at the rightward facet of prism 16A and leftward facet of prism 16B, with the yellow control element $C_Y$ being biased away from the TIR interface. The color blue is displayed because only blue light rays exit. Specifically, the yellow filter segment $F_Y$ atop prism 16A absorbs blue incident light rays 11, and passes both red and green incident light rays $I_R$, $I_G$ toward the leftward facet of prism 16A. The leftward magenta control element $C_M$ biased against the leftward facet of prism 16A absorbs the green light rays but totally internally reflects the red light rays toward the rightward facet of prism 16A. The cyan control element $C_C$ biased against the rightward facet of prism 16A absorbs the red light rays, so no light rays exit through yellow filter segment $F_Y$. The magenta filter segment $F_M$ atop prism 16B absorbs green incident light rays $I_G$ and passes both red and blue incident light rays $I_R$, $I_B$ toward the leftward facet of prism 16B. The cyan control element $C_C$ biased against the leftward facet of prism 16B absorbs the red light rays but totally internally reflects the blue light rays the rightward facet of prism 16B where the reflected blue light rays again undergo total internal reflection toward and exit through magenta filter segment $F_M$ as rays $R_B$. The cyan filter segment $F_C$ atop prism 16C absorbs red incident light rays $I_R$ and passes both green and blue incident light rays $I_G$, $I_B$; both of which are totally internally reflected at the leftward facet of prism 16C toward the rightward facet of prism 16C. The rightward magenta control element $C_M$ biased against the rightward facet of prism 16C absorbs the green light rays but totally internally reflects the blue light rays toward and through cyan filter segment $F_C$ as rays $R_B$.

FIG. 3H depicts the situation in which the color black is displayed by biasing the leftward magenta control element $C_M$ into optical contact with the TIR interface at the leftward facet of prism 16A, and biasing the rightward magenta control element $C_M$ into optical contact with the TIR interface at the rightward facet of prism 16C, and biasing the cyan control element $C_C$ into optical contact with the TIR interfaces at the rightward facet of prism 16A and leftward facet of prism 16B, and biasing the yellow control element $C_Y$ into optical contact with the TIR interfaces at the rightward facet of prism 16B and leftward facet of prism 16C. The color black is displayed because no light rays exit. Specifically, the yellow filter segment $F_Y$ atop prism 16A absorbs blue incident light rays $I_B$ and passes both red and green incident light rays $I_R$, $I_G$ toward the leftward facet of prism 16A. The leftward magenta control element $C_M$ biased against the leftward facet of prism 16A absorbs the green light rays but totally internally reflects the red light rays toward the rightward facet of prism 16A. The cyan control element $C_C$ biased against the rightward facet of prism 16A absorbs the red light rays, so no light rays exit through yellow filter segment $F_Y$. The magenta filter segment $F_M$ atop prism 16B absorbs green incident light rays $I_G$ and passes both red and blue incident light rays $I_R$, $I_B$ toward the leftward facet of prism 16B. The cyan control element $C_C$ biased against the leftward facet of prism 16B absorbs the red light rays but totally internally reflects the blue light rays the rightward facet of prism 16B. The yellow control element $C_Y$ biased against the rightward facet of prism 16B absorbs the blue light rays, so no light rays exit through magenta filter segment $F_M$. The cyan filter segment $F_C$ atop prism 16C absorbs red incident light rays $I_R$ and passes both green and blue incident light rays $I_G$, $I_B$ toward the rightward facet of prism 16C. The yellow control element $C_Y$ biased against the leftward facet of prism 16C absorbs the blue light rays but totally internally reflects the green light rays toward the rightward facet of prism 16C. The rightward magenta control element $C_M$ biased against the rightward facet of prism 16C absorbs the green light rays, so no light rays exit through cyan filter segment $F_C$.

By selectably varying the voltages applied between electrode 20 and each of electrodes 24, 26, 28, 30 one may vary the extent to which the respective control elements are biased toward and/or away from the aforementioned TIR interfaces, thereby varying the extent of color absorption and/or reflection at each such interface and thus display any desired color. The apparatus can accordingly be calibrated to display any particular color in response to a corresponding particular combination of voltages applied between electrode 20 and each of electrodes 24, 26, 28, 30. Alternatively, color absorption can be controlled by means of dithering, which is a technique used to simulate colors that are not within a currently available color palette. For example, one may group adjacent prismatic elements having different reflectivity characteristics such that the group as a whole produces a color which none of the individual prismatic elements within the group could produce. A time-dithering approach can also be used to oscillate one or more selected control elements into and out of the evanescent wave region at a selected frequency and duty cycle, thereby controlling the amount of time that the control element remains within the evanescent wave region and thus varying the absorption characteristic at the TIR interface to produce any desired color.

Figure 2C:
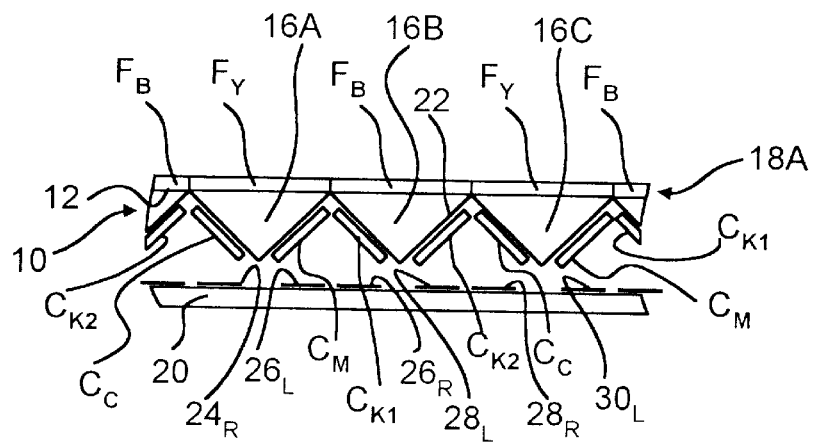
FIG. 2C is a fragmented cross-sectional view, on a greatly enlarged scale, of a portion of a color image display formed by interleaving two different filter-prism-control member structures; and shows an electrode structure for selectably and controllably moving a colored control member between a first position in which a gap remains between the member and an adjacent prism facet, and a second position in which the member is in optical contact with the adjacent prism facet.

As shown in FIG. 2C, instead of providing a single control element for each longitudinally adjacent leftward, rightward pair of prism facets, one may provide a separate control element for each prism facet, and provide a separate electrode on substrate 20 for each control element. FIG. 2C also shows that useful displays can be formed with only two different types of "controllable prism structure", each consisting of a prism, a color filter and two color absorbing control members. A first type of controllable prism structure is exemplified by prisms 16A and 16C, which both have a yellow filter segment $F_Y$, a cyan colored control element $C_C$ beneath the leftward prism facet, and a magenta colored control element $C_M$ beneath the rightward prism facet. A second type of controllable prism structure is exemplified by prism 16B, the prism to the left of prism 16A, and the prism to the right of prism 16C, all of which have a blue filter segment $F_B$, a first black colored control element $C_{K1}$ beneath the leftward prism facet, and a second black colored control element $C_{K2}$ beneath the rightward prism facet. It will be understood that a large number of the two types of controllable prism structures are interleaved to provide a spatially uniform distribution of both types of structure in any selected macroscopic portion of the display.

Control element $C_C$ is positioned above electrode segment $24_R$, beneath the leftward (as viewed in FIG. 2C) facet of prism 16A. Control element $C_M$ is positioned above electrode segment $26_L$, beneath the rightward facet of prism 16A. Application of a first voltage potential between electrodes 22, $24_R$ biases (retracts) control element $C_C$ toward substrate 20, leaving a gap between control element $C_C$ and the adjacent leftward facet of prism 16A, without affecting the prism to the left of prism 16A. Application of a second voltage potential between electrodes 22, $24_R$ biases control element $C_C$ toward sheet 10, placing control element $C_C$ in optical contact with the adjacent leftward facet of prism 16A, again without affecting the prism to the left of prism 16A. Application of the first voltage potential between electrodes 22, $26_L$ biases (retracts) control element $C_M$ toward substrate 20, leaving a gap between control element $C_M$ and the adjacent rightward facet of prism 16A, without affecting prism 16B. Application of the second voltage potential between electrodes 22, $26_L$ biases control element $C_M$ toward sheet 10, placing control element $C_M$ in optical contact with the adjacent rightward facet of prism 16A, again without affecting prism 16B. Appropriate control voltages are similarly applied to electrodes $28_R$, $30_L$ to move control elements $C_C$, $C_M$ with respect to prism 16C; and, to electrodes $26_R$, $28_L$ to move control elements $C_{K1}$, $C_{K2}$ with respect to prism 16B. As in the case of the FIG. 2A embodiment, each control element in the FIG. 2C embodiment may be an electrically conductive (or flexible conductor-bearing) elastomer material which can be controllably electronically actuated to deform the material into optical contact with the prism facets, and which regains its original shape when such electronic actuation is discontinued.

In the FIG. 2C display, the first type of controllable prism structure can be actuated to display any of the colors yellow, green, red or black. More particularly, the color yellow is displayed by biasing both control elements $C_Y$ and $C_M$ away from the respective prism facet TIR interfaces. The color yellow is displayed because equal proportions of the colors red and green exit. Specifically, the yellow filter $F_Y$ absorbs blue incident light rays and passes both red and green incident light rays which undergo total internal reflection twice within the prism and exit through blue filter $F_B$. The color green is displayed if the cyan control element $C_C$ is biased into optical contact with the TIR interface at the leftward prism facet with the magenta control element $C_M$ being biased away from the TIR interface at the rightward prism facet. The color green is displayed because only green light rays exit: the yellow filter $F_Y$ absorbs blue incident light rays and passes both red and green incident light rays; the cyan control element $C_C$ biased against the leftward prism facet absorbs red light rays, but totally internally reflects green light rays toward the rightward prism facet which totally internally reflects the green light rays toward and through blue filter $F_B$. The color red is displayed if the cyan control element $C_C$ is biased away from the TIR interface at the leftward prism facet, with the magenta control element $C_M$ being biased into optical contact with the TIR interface at the rightward prism facet. The color red is displayed because only red light rays exit: the yellow filter $F_Y$ absorbs blue incident light rays and passes both red and green incident light rays, both of which are totally internally reflected at the leftward prism facet toward the rightward prism facet; the magenta control element $C_M$ biased against the rightward prism facet absorbs green light rays but totally internally reflects red light rays toward and through blue filter $F_B$. The color black is displayed by biasing both control elements $C_Y$ and $C_M$ into optical contact with the respective prism facet TIR interfaces. The color black is displayed because no light rays exit: the yellow filter $F_Y$ absorbs blue incident light rays and passes both red and green incident light rays; the cyan control element $C_C$ biased against the leftward prism facet absorbs red light rays, but totally internally reflects green light rays toward the rightward prism facet; the magenta control element $C_M$ biased against the rightward prism facet absorbs the green light rays, so no light rays exit through blue filter $F_B$.

In the FIG. 2C display, the second type of controllable prism structure can be controllably actuated to produce either of the colors blue or black. More particularly, the color blue is displayed by biasing both black control elements $C_{K1}$, $C_{K2}$ away from the respective prism facet TIR interfaces. The color blue is displayed because only blue light rays exit. Specifically, the blue filter $F_B$ absorbs both red and green incident light rays and passes only blue incident light rays which undergo total internal reflection twice within the prism and exit through blue filter $F_B$. The color black is displayed if either one or both of the black control elements $C_{K1}$, $C_{K2}$ are biased into optical contact with the respective prism facet TIR interfaces. The color black is displayed because no light rays exit: the blue filter $F_B$ absorbs both red and green incident light rays and passes only blue incident light rays which are absorbed by either of the black control elements $C_{K1}$, $C_{K2}$, so no light rays exit through blue filter $F_B$. In a practical embodiment of the FIG. 2C display, one need only provide for controllable actuation of black control elements $C_{K1}$, $C_{K2}$ between two states; namely, a "blue" state in which both control elements $C_{K1}$, $C_{K2}$ are biased away from the respective prism facet TIR interfaces to display the color blue; and, a "black" state in which both control elements $C_{K1}$, $C_{K2}$ are biased into optical contact with the respective prism facet TIR interfaces to display the color black.

Due to the aforementioned spatially uniform distribution of both types of controllable prism structure in any selected macroscopic portion of the FIG. 2C display, the viewer perceives colors which result from a combination of the colors produced by the two types of structures. Because the two types of structures can be controllably actuated as aforesaid to produce the primary additive colors red, green and blue; and, by using the aforementioned voltage variation or dithering techniques, one may vary the color absorption characteristics at the respective TIR interfaces to produce any desired color.

The embodiment of FIG. 2C is exemplary of a more general version of the invention which requires only two different types of prism structures. As in the case of the embodiment of FIGS. 2A and 2B, the first "type" of prism structure utilized in the more general version of the invention consists of a prism, a color filter with a first selected spectral absorption characteristic (i.e. absorption as a function of wavelength) associated with a first facet (i.e. base) of the prism, a first control member with a second selected spectral absorption characteristic associated with a second facet of the prism, and a second control member with a third selected spectral absorption characteristic associated with a third facet of the prism. The second "type" of prism structure utilized in the more general version of the invention consists of a prism, a color filter with a fourth selected spectral absorption characteristic associated with a first facet (i.e. base) of the prism; and, at least one first control member with a fifth selected spectral absorption characteristic associated with either a second or a third, or both second and third facets of the prism. There is no essential relationship between the spectral absorption characteristics selected for the first type of prism structure and those selected for the second type of prism structure. One need only ensure that the spectral absorption characteristics are selected such that, for any selected set comprising proximate ones of each of the two types of prism structure, controlled movement of the members between particular selected combinations of their possible respective positions causes the set as a whole to reflect light which has an average spectral reflectance characteristic corresponding to any one of three independent colors, with no one of the independent colors being obtainable by mixing any other two of the independent colors.

Because each of the control elements depicted in the FIG. 2A embodiment is associated with not one but two prisms (i.e. control element $C_C$ is associated with the rightward facet of prism 16A and with the leftward facet of prism 16B), it is necessary to select spectral characteristics for the filter and control elements associated with any particular prism in the FIG. 2A embodiment such that none of the spectral characteristics selected for the filter and control elements associated with a prism adjacent to the particular prism can be obtained by mixing any two of the spectral characteristics selected for such adjacent prism. For example, having selected cyan for control element $C_C$ associated with prism 16B, one must not select cyan for the filter associated with the adjacent prism 16A since cyan colored control element $C_C$ is already associated with the rightward facet of prism 16A. However this restriction does not apply to the FIG. 2C embodiment, because the control elements associated with any particular prism in the FIG. 2C embodiment are not also associated with any adjacent prism(s).

Figure 4A:
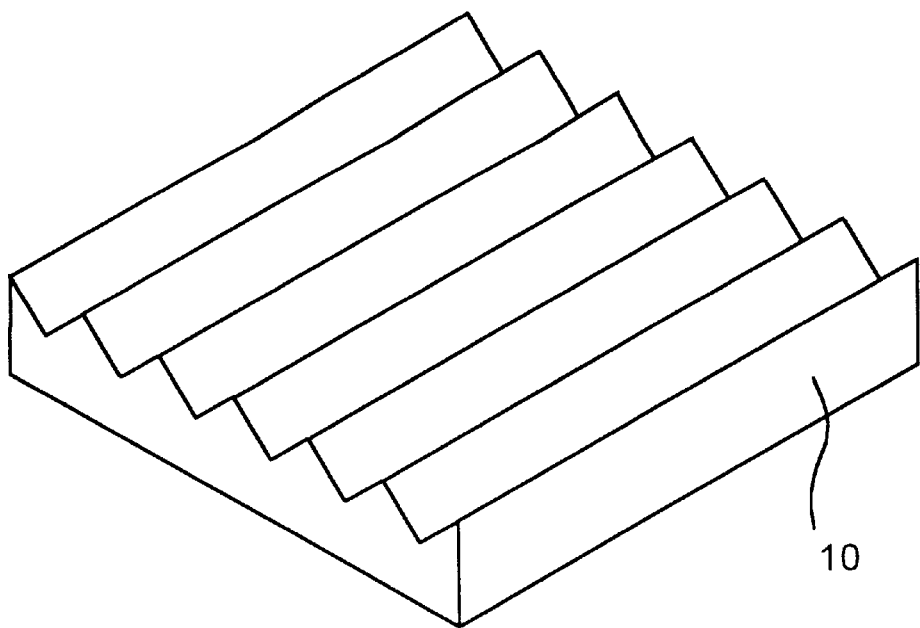
FIG. 4A is a fragmented, pictorial illustration, on a greatly enlarged scale, of a prismatic sheet material.
Figure 5A:
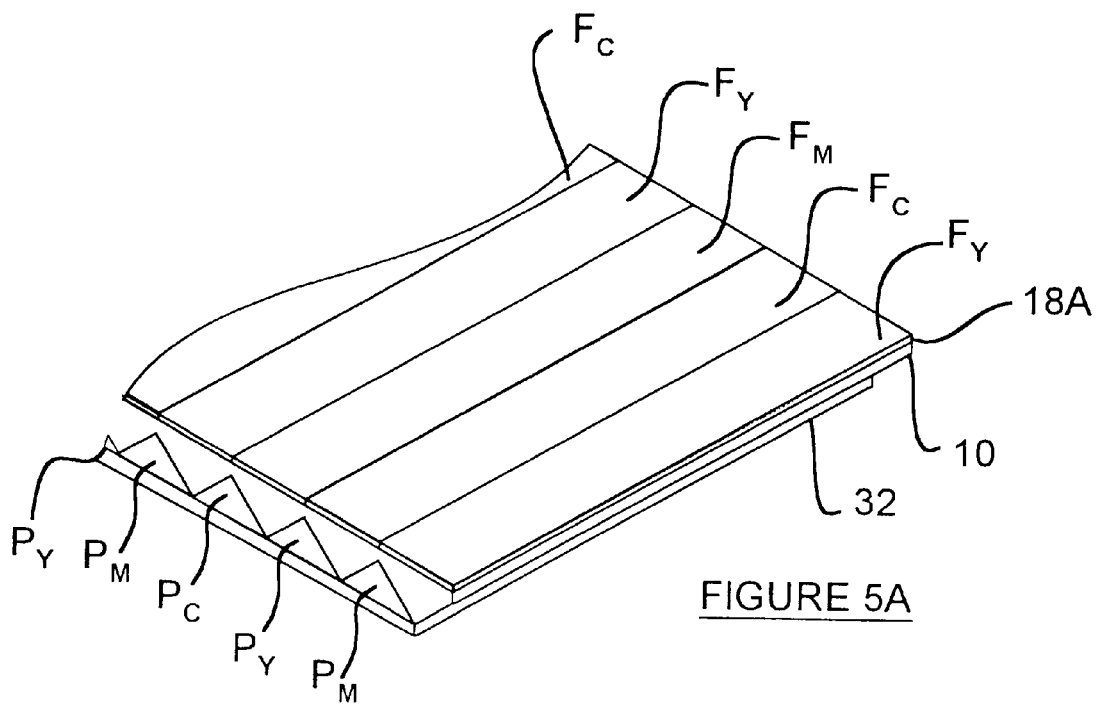
FIG. 5A is a fragmented, pictorial illustration, on a greatly enlarged scale, of a portion of a display combining the FIG. 1A prismatic material and external color filter with the FIG. 2B segmented electrode and colored absorptive particle group structure.
Figure 5B:
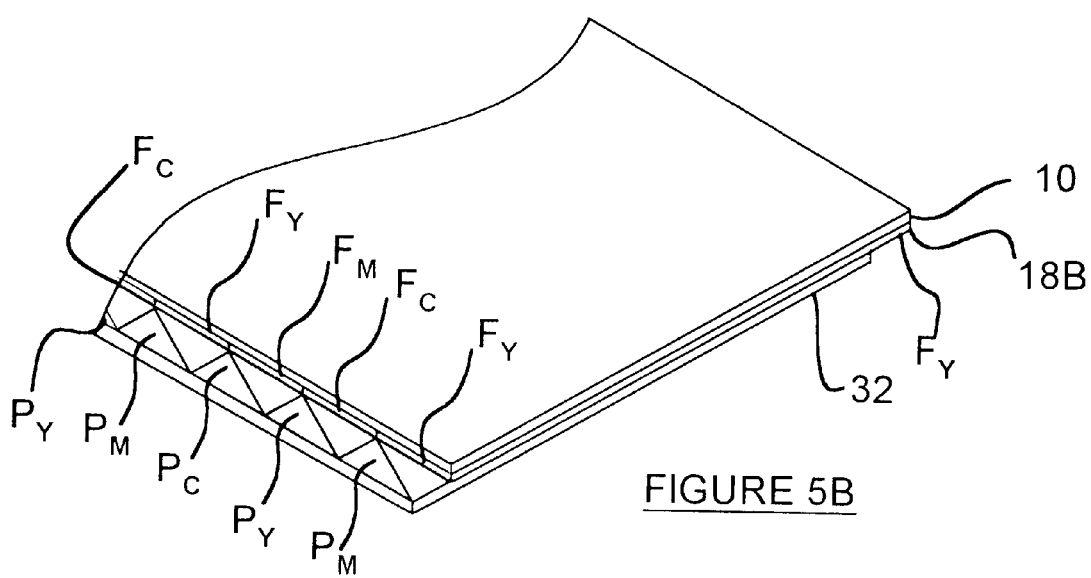
FIG. 5B is a fragmented, pictorial illustration, on a greatly enlarged scale, of a portion of a display combining the FIG. 1B prismatic material and embedded color filter with the FIG. 2B segmented electrode and subtractive colored absorptive particle group structure.

FIG. 4A provides an oblique pictorial illustration, on a greatly enlarged scale, of a sheet of prismatic material 10. By inverting sheet 10 to place the apices of its prisms in contact with an adhesive bearing surface of substrate 32 one may form a display structure (one small portion of which is seen in FIG. 5A) with channels for containment of electrophoretically suspended subtractive colored particles $P_C$, $P_Y$, $P_M$. The electrophoretic medium and particles can be selectively placed between adjacent prism facets on sheet 10 after it is inverted as shown in FIG. 4A, but before substrate 32 is adhesively bonded thereto. Alternatively, sheet 10 can be bonded to substrate 32 as aforesaid with an edge of sheet 10 (i.e. an edge intersecting the direction of longitudinal extent of the prisms) being allowed to extend a small distance beyond the adjacent edge of substrate 32. Droplets of particle containing electrophoretic media selectively placed in the extended portion of each channel are then wicked by capillary pressure into and fill the respective channels. As another alternative, the channels can be formed by inverting sheet 10, then contacting the prisms' apices with a liquid adhesive and allowing the adhesive to cure such that it forms a liquid impermeable barrier bridging the gap between adjacent prisms' apices and extending almost the full length of the prisms, but without filling the spaces between adjacent prism facets. Care is taken to leave a small adhesive-free region along an edge of sheet 10 so that droplets of particle containing electrophoretic media can subsequently be selectively placed in each channel by means of capillary pressure, as described above. As a still further alternative, precision ultrasonic welding techniques can be used to seal the prisms' apices to substrate 32. Subtractive color filter 18A with its repetitively adjacent yellow, magenta, cyan segments $F_Y$, $F_C$, $F_M$ can be bonded to the outward surface of sheet 10 after sheet 10 is bonded to substrate 32 as aforesaid, care being taken to orient segments $F_Y$, $F_C$, $F_M$ over the prisms as previously explained. Alternatively, before bonding sheet 10 to substrate 32 as aforesaid, one may first embed subtractive color filter 18B with its repetitively adjacent yellow, magenta, cyan segments $F_Y$, $F_C$, $F_M$ within sheet 10 to form a display structure (one small portion of which is seen in FIG. 5B) with channels for containment of subtractive colored particles $P_C$, $P_Y$, $P_M$ Persons skilled in the art will understand that, in practice, many thousands of parallel, longitudinally adjacent microscopically sized prisms and channels are required to form a high resolution display of a size sufficient for production of reasonably sized images. A large scale, low resolution image display can be similarly formed, but without microscopically small prisms.

Figure 4B:
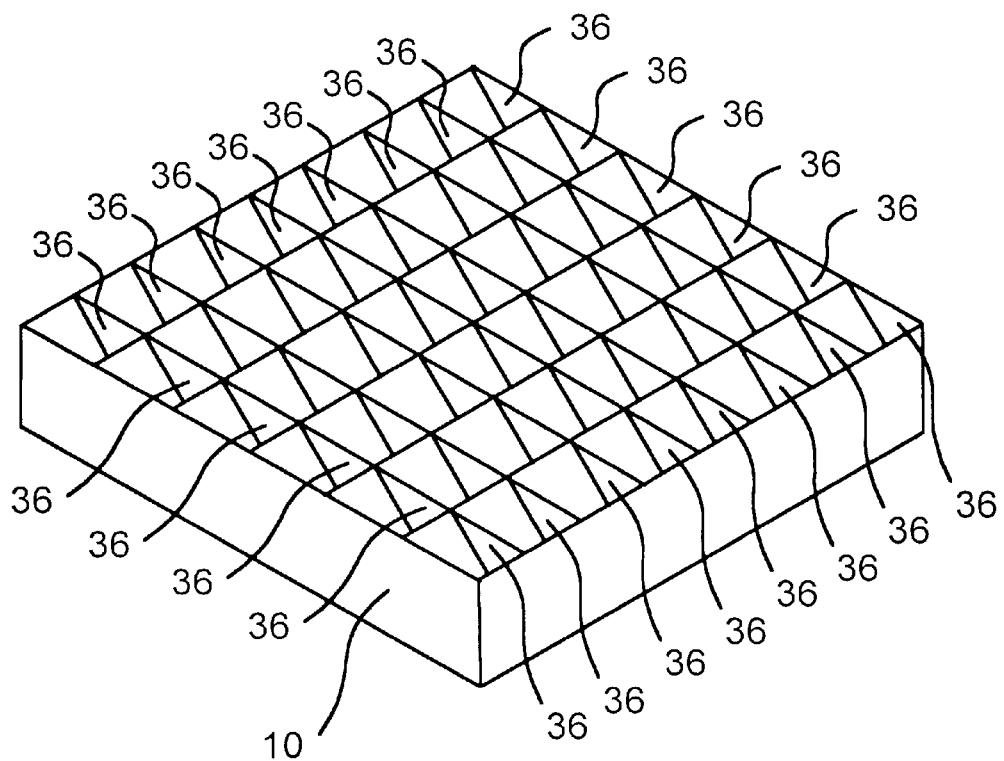
FIG. 4B shows the FIG. 4A sheet, with each channel between each longitudinally adjacent prism facet pair partitioned at spaced intervals to form a multiplicity of compartments along each such channel.

As shown in FIG. 4B, each one of the prism-shaped channels between adjacent prisms formed on prismatic sheet 10 can be subdivided into a multiplicity of compartments by using micro-replication casting techniques to form a plurality of barriers 36 at spaced intervals along each channel. This facilitates even distribution of subtractive colored particles $P_C$, $P_Y$, $P_M$ within the channels by providing a substantially equal quantity of cyan colored particles $P_C$ within each one of the compartments in a first channel, a substantially equal quantity of yellow colored particles $P_Y$ within each one of the compartments in a second channel, a substantially equal quantity of magenta colored particles $P_M$ within each one of the compartments in a third channel, etc. The separate compartments ensure initial uniform distribution of the particles along each channel and maintain such uniformity by substantially preventing particles suspended in one compartment from flowing into adjacent compartments (or channels) over time.

An important characteristic of the FIG. 2B embodiment of the invention is a large refractive index mismatch between sheet 10 and the electrophoretic medium in channels 34A, 34B, 34C, 34D. As is explained in the '103 application, if the index mismatch is insufficient to attain the critical angle at the TIR interface, then the FIG. 2B embodiment of the invention will not work. In such case, a pair of prismatic surfaces can be used to ensure that the incident light rays encounter the TIR interface at the requisite angle, as is for example described in relation to the FIG. 5 embodiment of the '784 patent.

Besides having the desired low refractive index, Fluorinerts are well also suited to use in displays formed in accordance with the invention because they are good electrical insulators, and they are inert. Fluorinerts also have low viscosity and high density, so particles suspended in Fluorinerts can be moved electrophoretically relatively easily. As noted above, ZnS is a preferred high refractive index material suitable for use in forming sheet 10. The sheet is preferably optically clear and has a high refractive index of approximately 2.4 in the range of visible wavelengths of light. (By "optically clear", it is meant that a substantial fraction of light incident on the material at normal incidence will pass through a selected thickness of the material, with only a small fraction of such light being absorbed by the material. Diminished optical clarity is caused by such absorption (typically a combination of both absorption and scattering), as the light passes through the material. In the FIG. 2B embodiment of the invention, sheet 10 need only be approximately 10 microns thick. A material which is "opaque" in bulk form may nevertheless be "optically clear" for purposes of the present invention, if a 10 micron thickness of such material absorbs (or absorbs and scatters) only a small fraction of normal incident light.) ZnS is also well suited to use in displays formed in accordance with the invention because it has low absorption characteristics and consequently high optical clarity in the aforementioned wavelength range. Further, ZnS is available in sheet form and can be machined to yield the desired prismatic microstructure as explained above.

Application of a voltage across the electrophoretic medium in channels 34A, 34B, 34C, 34D electrostatically charges particles $P_C$, $P_Y$, $P_M$, causing them to move into the evanescent wave region as aforesaid. When particles $P_C$, $P_Y$, $P_M$ move into the evanescent wave region they must be capable of frustrating TIR at the ZnS:Fluorinert interface for appropriate light wavelengths (i.e. cyan colored particles $P_C$ absorb red light wavelengths, etc., as previously explained) by absorbing the evanescent wave. Although particles $P_C$, $P_Y$, $P_M$ may be as large as one micron in diameter, the particles' diameter is preferably significantly sub-optical (i.e. an order of magnitude smaller than one micron, say 100 nm in diameter) such that a monolayer of particles at the TIR interface entirely fills the evanescent wave region. Useful results are obtained if the diameter of particles $P_C, P_Y, P_M$ is about one micron, but the image display device's contrast ratio is reduced because the ability of particles $P_C, P_Y, P_M$ to pack closely together at the TIR interface is limited by their diameter. More particularly, near the critical angle, the evanescent wave extends quite far into the electropho; retic medium in channels 34A, 34B, 34C, 34D, so particles having a diameter of about one micron are able to absorb the wave and thereby frustrate TIR. But, as the angle at which incident light rays strike the TIR interface increases relative to the critical angle, the depth of the evanescent wave region decreases significantly. Relatively large (i.e. one micron) diameter particles cannot be packed as closely into this reduced depth region and accordingly such particles are unable to frustrate TIR to the desired extent. Smaller diameter (i.e. 100 nm) particles can however be closely packed into this reduced depth region and accordingly such particles are able to frustrate TIR for incident light rays which strike the TIR interface at angles exceeding the critical angle.

As previously explained, a small critical angle is preferred at the TIR interface since this affords a large range of angles over which TIR may occur. The relatively large ratio of the index of refraction of ZnS to that of Fluorinert yields a critical angle of about 32°, which is quite small. In the absence of electrophoretic activity, as is illustrated for channels 34A, 34C and 34D in FIG. 2B, and further in the absence of subtractive color filtration as previously explained, an incident light ray which passes through sheet 10 undergoes TIR at the ZnS:Fluorinert interface and is retro-reflected as illustrated. This is because the 45° angle at which the ray encounters a leftward prism facet at the ZnS:Fluorinert TIR interface exceeds the interface's 32° critical angle. The reflected light ray then encounters the prism's rightward facet and again undergoes TIR at the second prism face, because the 45° angle at which the reflected ray encounters the rightward facet (which also forms part of the ZnS:Fluorinert TIR interface) exceeds the interface's 32° critical angle. After twice undergoing TIR as aforesaid the retro-reflected ray exits through the ZnS:air interface and emerges, as illustrated, in a direction nearly 180° opposite to the direction of the original incident ray, thus achieving a "white" appearance in the reflected light.

As will be apparent to those skilled in the art in the light of the foregoing disclosure, many alterations and modifications are possible in the practice of this invention without departing from the spirit or scope thereof. For example, yellow, magenta and cyan filter segments $F_Y, F_M, F_C$ need not occur in that specific order in subtractive color filters 18A, 18B. It is only necessary to select a particular ordering of the subtractive primary colors yellow, magenta and cyan and continuously repeat the subtractive primary colors in the selected order to form filters 18A, 18B; to orient the filter segments as previously described with respect to the prisms on sheet 10; and, to ensure that a different subtractive primary color is selected for each of (i) the filter segment atop a first prism, (ii) the filter segment atop a second prism immediately adjacent to the first prism, and (iii) the control element or particles disposed between the first and second prisms. Accordingly, the scope of the invention is to be construed in accordance with the substance defined by the following claims.

What is claimed is:

1. Color display apparatus comprising a spatially uniform distribution of at least first and second types of prism structure, wherein:

(a) said first type of prism structure further comprises:
  (i) a first prism;
  (ii) a first color filter positioned to filter light incident upon a first facet of said first prism, said first color filter having a first selected spectral absorption characteristic;
  (iii) a first member having a second selected spectral absorption characteristic, said first member movable with respect to a second facet of said first prism between:
    (1) a first position in which said first member is in optical contact with said second facet, producing a first absorptive state in which total internal reflection of light rays at said second facet is reduced as a function of wavelength in accordance with said second selected spectral absorption characteristic;
    (2) a second position in which said first member is not in optical contact with said second facet, producing a first reflective state in which light incident upon said second facet is totally internally reflected toward a third facet of said first prism;
  (iv) a second member having a third selected spectral absorption characteristic, said second member movable with respect to said third facet of said first prism between:
    (1) a third position in which said second member is in optical contact with said third facet, producing a second absorptive state in which total internal reflection of light rays at said third facet is reduced as a function of wavelength in accordance with said third selected spectral absorption characteristic;
    (2) a fourth position in which said second member is not in optical contact with said third facet, producing a second reflective state in which light incident upon said third facet is totally internally reflected toward and through said first color filter;
(b) said second type of prism structure further comprises:
  (i) a second prism;
  (ii) a second color filter positioned to filter light incident upon a first facet of said second prism, said second color filter having a fourth selected spectral absorption characteristic;
  (iii) a third member having a fifth selected spectral absorption characteristic, said third member movable with respect to a second facet of said second prism between:
    (1) a fifth position in which said third member is in optical contact with said second facet of said second prism, producing a third absorptive state in which total internal reflection of light rays at said second facet of said second prism is reduced as a function of wavelength in accordance with said fifth selected spectral absorption characteristic;
    (2) a sixth position in which said third member is not in optical contact with said second facet of said second prism, producing a third reflective state in which light incident upon said second facet of said second prism is totally internally reflected at said second facet of said second prism;
(c) said spectral absorption characteristics are selected such that, for any selected set comprising proximate ones of all of said types of prism structure, controlled movement of said members between particular selected combinations of said respective positions causes said set to reflect light having an average spectral reflectance characteristic corresponding to any one of three independent colors; and, (d) no one of said independent colors is obtainable by mixing any other two of said independent colors.

2. Color display apparatus as defined in claim 1, wherein:
(a) each one of said first types of prism structure is longitudinally adjacent to one of said second types of prism structure; and,
(b) each one of said second types of prism structure is longitudinally adjacent to one of said first types of prism structure.

3. Color display apparatus as defined in claim 1, wherein:
(a) said second type of prism structure further comprises:
  (i) a fourth member having a sixth selected spectral absorption characteristic, said fourth member movable with respect to a third facet of said second prism between:
    (1) a seventh position in which said fourth member is in optical contact with said third facet of said second prism, producing a fourth absorptive state in which total internal reflection of light rays at said third facet of said second prism is reduced as a function of wavelength in accordance with said sixth selected spectral absorption characteristic;
    (2) an eighth position in which said fourth member is not in optical contact with said third facet of said second prism, producing a fourth reflective state in which light incident upon said third facet of said second prism is totally internally reflected toward and through said second color filter;
(b) said spatially uniform distribution further comprises a third type of prism structure, said third type of prism structure further comprising:
  (i) a third prism;
  (ii) a third color filter positioned to filter light incident upon a first facet of said third prism, said third color filter having a seventh selected spectral absorption characteristic;
  (iii) a fifth member having an eighth selected spectral absorption characteristic, said fifth member movable with respect to a second facet of said third prism between:
    (1) a ninth position in which said fifth member is in optical contact with said second facet of said third prism, producing a fifth absorptive state in which total internal reflection of light rays at said second facet of said third prism is reduced as a function of wavelength in accordance with said eighth selected spectral absorption characteristic;
    (2) a tenth position in which said fifth member is not in optical contact with said second facet of said third prism, producing a fifth reflective state in which light incident upon said second facet of said third prism is totally internally reflected toward a third facet of said third prism;
  (iv) a sixth member having a ninth selected spectral absorption characteristic, said sixth member movable with respect to a third facet of said third prism between:
    (1) an eleventh position in which said sixth member is in optical contact with said third facet of said third prism, producing a sixth absorptive state in which total internal reflection of light rays at said third facet of said third prism is reduced as a function of wavelength in accordance with said ninth selected spectral absorption characteristic; and,
    (2) a twelfth position in which said sixth member is not in optical contact with said third facet of said third prism, producing a sixth reflective state in which light incident upon said third facet of said third prism is totally internally reflected toward and through said third color filter.

4. Color display apparatus as defined in claim 3, wherein said first spectral characteristic further comprises a first primary color, said fourth spectral characteristic further comprises a second primary color, and said seventh spectral characteristic further comprises a third primary color.

5. Color display apparatus as defined in claim 4, wherein said first, second and third primary colors are subtractive primary colors.

6. Color display apparatus as defined in claim 4, wherein said second spectral characteristic further comprises said second primary color, said third spectral characteristic further comprises said third primary color, said fifth spectral characteristic further comprises said third primary color, said sixth spectral characteristic further comprises said first primary color, said eighth spectral characteristic further comprises said first primary color, and said ninth spectral characteristic further comprises said second primary color.

7. Color display apparatus as defined in claim 1, wherein:
(a) said first member further comprises a first plurality of absorptive particles suspended in an electrophoretic medium contacting said second facet of said first prism;
(b) said second member further comprises a second plurality of absorptive particles suspended in an electrophoretic medium contacting said third facet of said first prism; and,
(c) said third member further comprises a third plurality of absorptive particles suspended in an electrophoretic medium contacting said second facet of said second prism.

8. Color display apparatus as defined in claim 3, wherein:
(a) said first member further comprises a first plurality of absorptive particles suspended in an electrophoretic medium contacting said second facet of said first prism;
(b) said second member further comprises a second plurality of absorptive particles suspended in an electrophoretic medium contacting said third facet of said first prism;
(c) said third member further comprises a third plurality of absorptive particles suspended in an electrophoretic medium contacting said second facet of said second prism;
(d) said fourth member further comprises a fourth plurality of absorptive particles suspended in an electrophoretic medium contacting said third facet of said second prism;
(e) said fifth member further comprises a fifth plurality of absorptive particles suspended in an electrophoretic medium contacting said second facet of said third prism; and,
(f) said sixth member further comprises a sixth plurality of absorptive particles suspended in an electrophoretic medium contacting said third facet of said third prism.

9. Color display apparatus as defined in claim 3, wherein:
(a) said first member and said sixth member of another one of said third type of prism structure adjacent to said first type of prism structure together comprise a first plurality of absorptive particles suspended in an electrophoretic medium contacting said second facet of said first prism;

(b) said second member and said third member together comprise a second plurality of absorptive particles suspended in an electrophoretic medium contacting said third facet of said first prism and contacting said second facet of said second prism; and, (c) said fourth member and said fifth member together comprise a third plurality of absorptive particles suspended in an electrophoretic medium contacting said third facet of said second prism and contacting said second facet of said third prism.

10. Color display apparatus as defined in claim 1, wherein said first, second and third members each further comprise a deformable elastomeric member.

11. Color display apparatus as defined in claim 3, wherein said first, second, third, fourth, fifth and sixth members each further comprise a deformable elastomeric member.

12. Color display apparatus as defined in claim 11, wherein said second member and said third member together comprise one of said deformable elastomeric members and said fourth member and said fifth member together comprise another one of said deformable elastomeric members.

13. Color display apparatus as defined in claim 1, wherein said first facets of said first and second prisms collectively comprise a viewing surface, said apparatus further comprising:

(a) a substrate extending substantially parallel to said viewing surface;

(b) a first electrode on said second and third facets of each of said first and second prisms;

(c) a second electrode on said substrate adjacent said second facet of said first prism;

(d) a third electrode on said substrate adjacent said third facet of said first prism;

(e) a fourth electrode on said substrate adjacent said second facet of said second prism; said apparatus further comprising a voltage source for selectably applying:

(i) a first voltage potential between said first and second electrodes to move said first member into said first position;

(ii) a second voltage potential between said first and second electrodes to move said first member into said second position;

(iii) a third voltage potential between said first and third electrodes to move said second member into said third position;

(iv) a fourth voltage potential between said first and third electrodes to move said second member into said fourth position;

(v) a fifth voltage potential between said first and fourth electrodes to move said third member into said fifth position; and, (vi) a sixth voltage potential between said first and fourth electrodes to move said third member into said sixth position.

14. Color display apparatus as defined in claim 3, wherein said first facets of said first, second and third prisms collectively comprise a viewing surface, said apparatus further comprising:

(a) a substrate extending substantially parallel to said viewing surface;

(b) a first electrode on said second and third facets of each of said first, second and third prisms;

(c) a second electrode on said substrate adjacent said second facet of said first prism;

(d) a third electrode on said substrate adjacent said third facet of said first prism;

(e) a fourth electrode on said substrate adjacent said second facet of said second prism;

(f) a fifth electrode on said substrate adjacent said third facet of said second prism;

(g) a sixth electrode on said substrate adjacent said second facet of said third prism;

(h) a seventh electrode on said substrate adjacent said third facet of said third prism; said apparatus further comprising a voltage source for selectably applying:

(i) a first voltage potential between said first and second electrodes to move said first member into said first position;

(ii) a second voltage potential between said first and second electrodes to move said first member into said second position;

(iii) a third voltage potential between said first and third electrodes to move said second member into said third position;

(iv) a fourth voltage potential between said first and third electrodes to move said second member into said fourth position;

(v) a fifth voltage potential between said first and fourth electrodes to move said third member into said fifth position;

(vi) a sixth voltage potential between said first and fourth electrodes to move said third member into said sixth position;

(vii) a seventh voltage potential between said first and fifth electrodes to move said fourth member into said seventh position;

(viii) an eighth voltage potential between said first and sixth electrodes to move said fifth member into said ninth position; and, (ix) a tenth voltage potential between said first and seventh electrodes to move said sixth member into said eleventh position.

15. Color display apparatus as defined in claim 1, wherein said color filters are formed on said first facets of said respective prisms.

16. Color display apparatus as defined in claim 1, wherein said color filters are formed within said first facets of said respective prisms.

17. Color display apparatus as defined in claim 3, wherein said color filters are formed on said first facets of said respective prisms.

18. Color display apparatus as defined in claim 3, wherein said color filters are formed within said first facets of said respective prisms.

19. Color display apparatus as defined in claim 7, wherein said electrophioretic medium is Fluorinert.

20. Color display apparatus as defined in claim 8, wherein said electrophoretic medium is Fluorinert.

21. Color display apparatus as defined in claim 1, wherein said prisms are formed of zinc sulphide.

22. Color display apparatus as defined in claim 3, wherein said prisms are formed of zinc sulphide.

23. Color display apparatus as defined in claim 10, wherein said elastomer members have stiff surfaces.

24. Color display apparatus as defined in claim 11, wherein said elastomer members have stiff surfaces.

25. Color display apparatus as defined in claim 7, wherein:

(a) said first plurality of absorptive particles suspended in said electrophoretic medium are confined within a first channel formed adjacent said second facet of said first prism;

(b) said second plurality of absorptive particles suspended in said electrophoretic medium are confined within a second channel formed adjacent said third facet of said first prism; and, (c) said third plurality of absorptive particles suspended in said electrophoretic medium are confined within a third channel formed adjacent said second facet of said second prism.

26. Color display apparatus as defined in claim 8, wherein:
(a) said first and said sixth plurality of absorptive particles suspended in said electrophoretic medium are confined together within a first channel formed adjacent said second facet of said first prism and adjacent said third facet of said third prism of another one of said third type of prism structure adjacent to said first type of prism structure;
(b) said second and said third plurality of absorptive particles suspended in said electrophoretic medium are confined together within a second channel formed adjacent said third facet of said first prism and adjacent said second facet of said second prism; and,
(c) said fourth and said fifth plurality of absorptive particles suspended in said electrophoretic medium are confined together within a third channel formed adjacent said second facet of said third prism and adjacent said second facet of said third prism.

27. Color display apparatus as defined in claim 7, wherein:
(a) said first plurality of absorptive particles suspended in said electrophoretic medium are distributed among and confined within a first plurality of compartments formed along and adjacent said second facet of said first prism;
(b) said second plurality of absorptive particles suspended in said electrophoretic medium are distributed among and confined within a second plurality of compartments formed along and adjacent said third facet of said first prism; and,
(c) said third plurality of absorptive particles suspended in said electrophoretic medium are distributed among and confined within a third plurality of compartments formed along and adjacent said second facet of said second prism.

28. Color display apparatus as defined in claim 8, wherein:
(a) said first and sixth plurality of absorptive particles suspended in said electrophoretic medium are distributed among and confined together within a first plurality of compartments formed along and adjacent said second facet of said first prism and adjacent said third facet of said third prism of another one of said third type of prism structure adjacent to said first type of prism structure;
(b) said second and third plurality of absorptive particles suspended in said electrophoretic medium are distributed among and confined together within a second plurality of compartments formed along and adjacent said third facet of said first prism and along and adjacent said second facet of said second prism; and,
(c) said fourth and fifth plurality of absorptive particles suspended in said electrophoretic medium are distributed among and confined together within a third plurality of compartments formed along and adjacent said second facet of said third prism and along and adjacent said second facet of said third prism.

29. A color image display method, comprising filtering and totally internally reflecting light at each one of a plurality of at least first and second types of spatially uniform distributed locations, said method further comprising:
(a) at each one of said first type of said locations:
(i) filtering incident light through a first facet of a first prism to absorb a first selected spectral component of said incident light and reflect toward a second facet of said first prism a first light ray lacking said first spectral component;
(ii) selectably absorbing a second selected spectral component of said first light ray at said second facet of said first prism and totally internally reflecting toward a third facet of said first prism a second light ray lacking said first spectral component and selectably lacking said second spectral component;
(iii) selectably absorbing a third selected spectral component of said second light ray at said third facet of said first prism and totally internally reflecting toward and through said first facet of said first prism a third light ray lacking said first spectral component and selectably lacking said second spectral component and selectably lacking said third spectral component;
(b) at each one of said second type of said locations:
(i) filtering said incident light through a first facet of a second prism to absorb a fourth selected spectral component of said incident light and reflect toward a second facet of said second prism a fourth light ray lacking said fourth spectral component;
(ii) selectably absorbing a fifth selected spectral component of said fourth light ray at either one or both of:
(1) said second facet of said second prism;
(2) a third facet of said second prism; to produce a fifth light ray lacking said fourth spectral component and selectably lacking said fifth spectral component;
(iii) at said second facet of said second prism, totally internally reflecting said either one of said fourth or fifth light rays toward said third facet of said second prism;
(iv) at said third facet of said second prism, totally internally reflecting said fifth light ray toward and through said first facet of said second prism;
wherein:
(v) said spectral components are selected such that, for any selected set comprising proximate ones of all of said types of locations, particular selected combinations of said selectably absorbing of said spectral components causes said set to reflect light having an average spectral reflectance characteristic corresponding to any one of three independent colors; and,
(vi) no one of said independent colors is obtainable by mixing any other two of said independent colors.

30. A method as defined in claim 29, wherein:
(a) said fifth selected spectral component of said fourth light ray is selectably absorbed at said second facet of said second prism and totally internally reflecting toward said third facet of said second prism as said fifth light ray;
(b) said spatially uniform distributed locations further comprising a third type of location; said method further comprising:
(i) selectably absorbing a sixth selected spectral component of said fifth light ray at said third facet of said second prism and totally internally reflecting toward and through said first facet of said second prism a sixth light ray lacking said fourth spectral component and selectably lacking said fifth spectral component and selectably lacking said sixth spectral component;

(c) at each one of said third type of said locations:
  (i) filtering said incident light through a first facet of a third prism to absorb a seventh selected spectral component of said incident light and reflect toward a second facet of said third prism a seventh light ray lacking said seventh spectral component;
  (ii) selectably absorbing an eighth selected spectral component of said seventh light ray at said second facet of said third prism and totally internally reflecting toward a third facet of said third prism an eighth light ray lacking said seventh spectral component and selectably lacking said eighth spectral component; and,
  (iii) selectably absorbing a ninth selected spectral component of said eighth light ray at said third facet of said third prism and totally internally reflecting toward and through said first facet of said third prism a ninth light ray lacking said seventh spectral component and selectably lacking said eighth spectral component and selectably lacking said ninth spectral component.

31. A method as defined in claim 30, wherein said first spectral component further comprises a first primary color, said fourth spectral component further comprises a second primary color, and said seventh spectral component further comprises a third primary color.

32. A method as defined in claim 31, wherein said first, second and third primary colors are subtractive primary colors.

33. A method as defined in claim 32, wherein said second spectral component further comprises said second primary color, said third spectral component further comprises said third primary color, said fifth spectral component further comprises said third primary color, said sixth spectral component further comprises said first primary color, said eighth spectral component further comprises said first primary color, and said ninth spectral component further comprises said second primary color.

34. A method as defined in claim 29, wherein:
(a) said selectably absorbing said second selected spectral component further comprises electrophoretically moving a first plurality of absorptive particles into optical contact with said second facet of said first prism;
(b) said selectably absorbing said third selected spectral component further comprises electrophoretically moving a second plurality of absorptive particles into optical contact with said third facet of said first prism; and,
(c) said selectably absorbing said fifth selected spectral component further comprises electrophoretically moving a third plurality of absorptive particles into optical contact with said second facet of said second prism.

35. A method as defined in claim 30, wherein:
(a) said selectably absorbing said second selected spectral component further comprises electrophoretically moving a first plurality of absorptive particles into optical contact with said second facet of said first prism;
(b) said selectably absorbing said third selected spectral component further comprises electrophoretically moving a second plurality of absorptive particles into optical contact with said third facet of said first prism;
(c) said selectably absorbing said fifth selected spectral component further comprises electrophoretically moving a third plurality of absorptive particles into optical contact with said second facet of said second prism;
(d) said selectably absorbing said sixth selected spectral component further comprises electrophoretically moving a fourth plurality of absorptive particles into optical contact with said second facet of said second prism;
(e) said selectably absorbing said eighth selected spectral component further comprises electrophoretically moving a fifth plurality of absorptive particles into optical contact with said second facet of said third prism; and,
(f) said selectably absorbing said ninth selected spectral component further comprises electrophoretically moving a sixth plurality of absorptive particles into optical contact with said second facet of said third prism.

36. A method as defined in claim 29, wherein:
(a) said selectably absorbing said second selected spectral component further comprises moving a first elastomeric member into optical contact with said second facet of said first prism;
(b) said selectably absorbing said third selected spectral component further comprises moving a second elastomeric member into optical contact with said third facet of said first prism; and,
(c) said selectably absorbing said fifth selected spectral component further comprises moving a third elastomeric member into optical contact with said second facet of said second prism.

37. A method as defined in claim 30, wherein:
(a) said selectably absorbing said second selected spectral component further comprises moving a first elastomeric member into optical contact with said second facet of said first prism;
(b) said selectably absorbing said third selected spectral component further comprises moving a second elastomeric member into optical contact with said third facet of said first prism;
(c) said selectably absorbing said fifth selected spectral component further comprises moving a third elastomeric member into optical contact with said second facet of said second prism;
(d) said selectably absorbing said sixth selected spectral component further comprises moving a fourth elastomeric member into optical contact with said second facet of said second prism;
(e) said selectably absorbing said eighth selected spectral component further comprises moving a fifth elastomeric member into optical contact with said second facet of said second prism; and,
(f) said selectably absorbing said ninth selected spectral component further comprises moving a sixth elastomeric member into optical contact with said second facet of said third prism.

38. A method as defined in claim 34, further comprising:
(a) forming a first channel adjacent said second facet of said first prism, placing an electrophoretic medium in said first channel, and suspending said first plurality of absorptive particles in said electrophoretic medium within said first channel;
(b) forming a second channel adjacent said third facet of said first prism, placing an electrophoretic medium in said second channel, and suspending said second plurality of absorptive particles in said electrophoretic medium within said second channel; and,
(c) forming a third channel adjacent said second facet of said second prism, placing an electrophoretic medium in said third channel, and suspending said third plurality of absorptive particles in said electroplioretic medium within said third channel.

39. A method as defined in claim 35, further comprising:
(a) forming a first channel adjacent said second facet of said first prism and adjacent said third facet of said third prism, placing an electrophoretic medium in said first channel, and suspending said first and sixth plurality of absorptive particles together in said electrophoretic medium within said first channel;
(b) forming a second channel adjacent said third facet of said first prism and adjacent said second facet of said second prism, placing an electrophoretic medium in said second channel, and suspending said second and said third plurality of absorptive particles together in said electroplioretic medium within said second channel; and,
(c) forming a third channel adjacent said third facet of said second prism and adjacent said second facet of said third prism, placing an electrophoretic medium in said third channel, and suspending said fourth and said fifth plurality of absorptive particles together in said electrophoretic medium within said third channel.

40. A method as defined in claim 34, further comprising:
(a) forming a first plurality of compartments along and adjacent said second facet of said first prism, placing an electrophoretic medium in each of said first plurality of compartments, and suspending said first plurality of absorptive particles in said electroplioretic medium within each of said first plurality of compartments;
(b) forming a second plurality of compartments along and adjacent said third facet of said second prism, placing an electrophoretic medium in each of said second plurality of compartments, and suspending said second plurality of absorptive particles in said electrophoretic medium within each of said second plurality of compartments; and,
(c) forming a third plurality of compartments along and adjacent said second facet of said second prism, placing an electrophoretic medium in each of said third plurality of compartments, and suspending said third plurality of absorptive particles in said electrophoretic medium within each of said third plurality of compartments.

41. A method as defined in claim 35, further comprising:
(a) forming a first plurality of compartments along and adjacent said second facet of said first prism and along and adjacent said third facet of said third prism, placing an electrophoretic medium in each of said first plurality of compartments, and suspending said first and sixth plurality of absorptive particles together in said electrophoretic medium within each of said first plurality of compartments;
(b) forming a second plurality of compartments along and adjacent said third facet of said second prism and along and adjacent said second facet of said second prism, placing an electrophoretic medium in each of said second plurality of compartments, and suspending said second and third plurality of absorptive particles together in said electrophoretic medium within each of said second plurality of compartments; and,
(c) forming a third plurality of compartments along and adjacent said third facet of said second prism and along and adjacent said second facet of said third prism, placing an electrophoretic medium in each of said third plurality of compartments, and suspending said fourth and fifth plurality of absorptive particles together in said electrophoretic medium within each of said third plurality of compartments.

* * * * *